United States Patent [19]

Ohya et al.

[11] Patent Number: 5,444,316

[45] Date of Patent: Aug. 22, 1995

[54] HYBRID STEPPING MOTOR, DRIVING METHOD FOR THE SAME AND COIL WINDING METHOD FOR THE SAME

[75] Inventors: Hiroo Ohya, Iruma; Toshiaki Sato, Tokyo; Toshio Takahashi, Tokyo; Makoto Wakakuwa, Higashi-Yamato; Mizukami Masao, Tokyo; Masaru Fujita, Shiki; Sadao Miyazawa, Nagano; Noriaki Aruga, Ina, all of Japan

[73] Assignee: Ishikawajima Harima Heavy Industries Co., Ltd., Tokyo, Japan

[21] Appl. No.: 97,796

[22] Filed: Jul. 27, 1993

[30] Foreign Application Priority Data

Jul. 31, 1992 [JP] Japan .................................. 4-205669
Jul. 20, 1993 [JP] Japan .................................. 5-179298

[51] Int. Cl.$^6$ ............................................. H02K 37/00
[52] U.S. Cl. .................................. 310/49 R; 318/696
[58] Field of Search ...................... 310/49 R; 318/696

[56] References Cited

U.S. PATENT DOCUMENTS

| | | | |
|---|---|---|---|
| 3,866,104 | 2/1975 | Heine | 318/696 |
| 4,607,204 | 8/1986 | Setoya | 318/696 |
| 4,745,312 | 5/1988 | Nagasaka | 310/49 R |
| 5,272,401 | 12/1993 | Lin | 310/49 R |

FOREIGN PATENT DOCUMENTS 1556404 11/1975 United Kingdom .

*Primary Examiner*—Thomas M. Dougherty
*Assistant Examiner*—Judson H. Jones
*Attorney, Agent, or Firm*—Thomas K. Ziegler

[57] ABSTRACT

A ten-phase and twenty-main pole hybrid stepping motor is driven by a five-phase driving pulse. The rotor has N and S pole tooth gears at ends of a rotor shaft. The stator has a cylindrical hollow body. Nos. 1–20 main poles extend from an inner wall of the hollow body toward the rotor shaft in a plane perpendicular to the rotor shaft so that the twenty main poles surround the N and S pole teeth in the plane perpendicular to the rotor shaft. Each main pole has a free end at which two stator teeth are formed. The stator teeth face the teeth of N and S pole teeth gears. A coil is wound around each main pole for excitation of the main pole. Nos. 1–10 main poles and Nos. 11–20 main poles face each other in the radial direction of the rotor respectively. An arbitrary main pole and a fifth next main pole always have a 90-degree relation. Positions of the teeth on Nos. 1–10 and Nos. 11–20 main poles are respectively determined by an expression with non-overlapping m being substituted:

$$Pt \times k + m \times \theta$$

where Pt represents the rotor tooth pitch, $\theta$ represents the magnitude of the stepping pitch, m represents an arbitrary integer between 0 and 9, k represents an arbitrary integer between 0 and K−1 and K represents a number of N pole teeth.

29 Claims, 13 Drawing Sheets

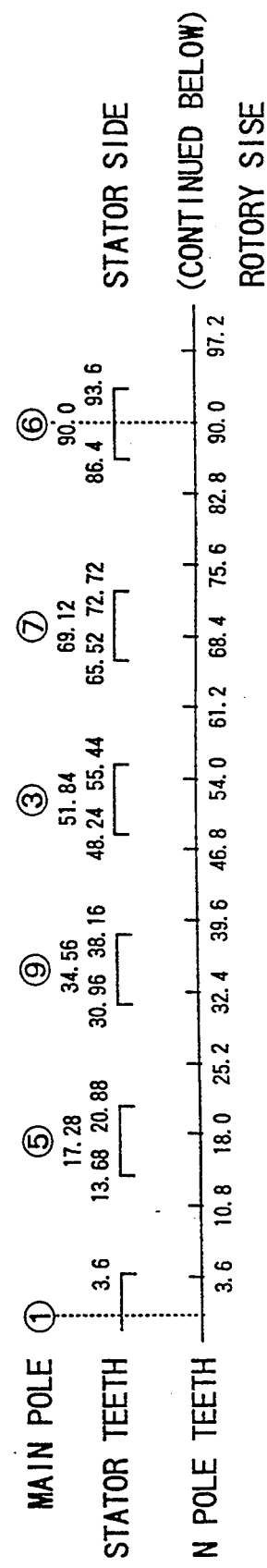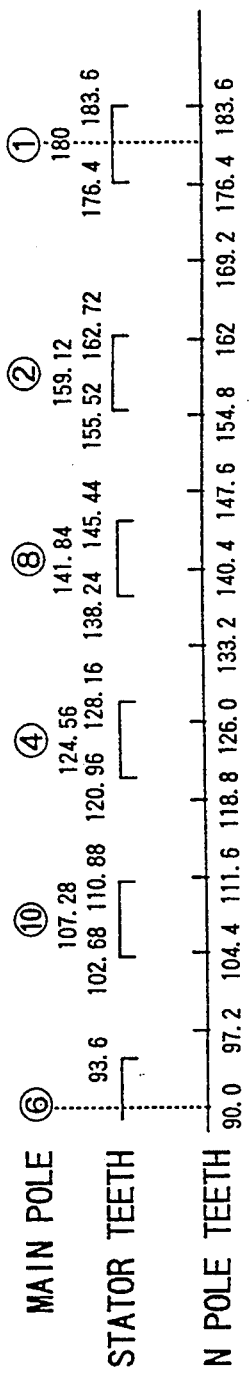

N: NORMAL DIRECTION
R: REVERSE DIRECTION

HYBRID STEPPING MOTOR, DRIVING METHOD FOR THE SAME AND COIL WINDING METHOD FOR THE SAME

BACKGROUND OF THE INVENTION

1. Technical Field

The present invention relates to a hybrid stepping motor of which rotor has a permanent magnet to achieve a high efficiency and is shaped like a gear to realize a very small angular rotation, and more particularly to a hybrid stepping motor which is easy to drive, has a stability at a high speed and ensures a high productivity.

2. Background Art

Today, stepping motors are used in various fields of industry since its rotational angle and rotational speed can be controlled with high precision. Particularly, a hybrid stepping motor is outstanding since it has many advantages.

A typical hybrid stepping motor includes a rotor made from two vertically extending rod-shaped pieces (N and S polarity pieces) and a stator provided with four or five pairs of electromagnet. If the stator has four pairs of electromagnets (eight electromagnets in total), a rotation angle for one stepping motion is 45 degrees (360/8=45) and if the stator has five pairs of electromagnet (ten in total), the rotational angle for one stepping motion is 36 degrees (360/10=36). These eight or ten electromagnets are arranged at constant intervals on an inner wall of the stator in a circumferential direction of the stator.

Generally, it is possible to independently excite the respective pairs of electromagnet. The electromagnets are excited in the order of their positions in the circumferential direction of the stator. The excitation is performed to attract the N and S pole pieces. The stepping motor which requires four stepping motions to rotate the rotor 180 degrees (i.e., the stepping motor having four pairs of electromagnets) is called "four-phase" stepping motor and one which requires five stepping motions (i.e., the stepping motor having five pairs of electromagnets) is called "five-phase" stepping motor. As compared with the four-phase type one, the five-phase stepping motor has a smaller rotation angle for one stepping motion (36 degrees), which results in a higher resolution and stability. However, the five-phase stepping motor does not have electromagnets having a 90-degree relation (ten electromagnets are arranged at 36-degree intervals) so that if one electromagnet attracts the N pole piece, the S pole piece which vertically crosses the N pole piece is attracted by two electromagnets (second and third next electromagnets at 72 and 108 degree positions). Technically, it would be advantageous if the S pole pieces was attracted by a single electromagnet. In the next stepping motion, two electromagnets attract in combination the N pole piece and one electromagnet attracts the S pole piece. Therefore, the five-phase stepping motor requires a complicated combination of excitation. On the other hand, the four-phase stepping motor has eight electromagnets at 45-degree intervals so that when one electromagnets attracts the N pole piece, another electromagnet attracts the S pole piece. However, since the stepping pitch of the four-phase stepping motor is large (45 degrees), the resolution is degraded and the torque stability is also degraded. Accordingly, the four-phase type one and the five-phase type one have complementary features relative to each other.

If a number of electromagnets or phases of the stepping motor increases, the rotation angle for one stepping motion becomes smaller. As a result, the resolution is raised and fluctuation of torque between the steps is reduced. However, there is a limitation on the increment of the number of the electromagnets.

Meanwhile, another type of stepping motor is known in the art: each of the N and S pole pieces of the rotor is shaped like a gear and the electromagnets of the stator have teeth (stator teeth) on their free ends respectively at constant intervals such that the stator teeth face teeth on the N and S pole gears (rotor teeth). Movement corresponding to one tooth pitch of the rotor teeth is caused by four or five stepping motions. As to this type of stepping motor, a number of stepping motions required to rotate the rotor one rotor tooth pitch is called "number of phases". The rotational angle for one stepping motion is obtained by dividing the rotor tooth pitch by the number of phases. The number of phases is the same as a number of excitation patterns.

The hybrid stepping motor having a gear-shaped rotor has a smaller stepping pitch, but the combination or order of excitation to the electromagnets (called "main poles" hereinafter) is the same as the stepping motors having the rod-shaped rotor. In other words, if the rotor is shaped like a gear, the five-phase type has a larger number of phases and its rotation angle for one stepping motion is smaller than the four-phase type, but the five-phase one does not have main poles having a 90-degree relation and accordingly the combination of excitation is complicated as compared with a four-phase type one. Such a complicated combination of excitation is not preferred to the torque efficiency to the electric power and the rotational stability.

There is an arrangement for rationalizing the combination of excitation. The intervals between each adjacent stator teeth are not made equal to each other and the rotational angles for the respective stepping motions are varied to correspond to the unequal intervals. This arrangement also can reduce the stepping pitch. To arrange the stator teeth at unequal intervals, the main pole intervals should be changed or the tooth or teeth on the main pole should be formed with certain discrepancy with respect to the center line of the main pole without changing the intervals of the main poles. However, if the intervals (angle) between the main poles are not uniform, the symmetry around the rotation axis of the stepping motor is deteriorated and the motor surfers from a degraded stability during the high speed rotation, and if the teeth on one main pole are formed with the discrepancy, magnetic fields of uniform intensity cannot be expected even if same power is applied to the main poles since coils are wound around the main poles.

In addition, generally the stepping motors are manufactured in large quantities, but wiring requires human labors. Therefore, it is desired to simplify the manufacturing process. To achieve this, a wiring machine should be used effectively and the stator should have a structure which enables an automatic manufacturing.

SUMMARY OF THE INVENTION

An object of the present invention is to provide a hybrid stepping motor which can eliminate the above-mentioned problems, i,e., a stepping motor which is easy to operate, stable during a high speed rotation and suitable for a mass production.

First, the inventors thought that employing a ten-phase hybrid stepping motor which has advantageous characteristics of both four and five-phase types may eliminate the above-mentioned conflicting problems of the four-phase and five-phase hybrid stepping motor. However, the ten-phase stepping motor has twenty main poles and this is disadvantageous to the mass production (coil winding labor increases). Accordingly, such an disadvantage should be overcome.

In summary, it is necessary to wind a plurality of coils around respective main poles at the same time so as to reduce the time for winding the coils, to enlarge a clearance between the stator teeth on adjacent main poles so as to facilitate insertion of a nozzle of a winding machine, to improve the symmetry about the stator axis and the balance of main pole arrangement so as to improve the stability during the high speed rotation and to form the stator teeth on each main pole symmetrically with the center line of the main pole so as to allow the stator teeth to have a uniform magnetic field intensity.

It is also important to simplify the operation of the stepping motor and the structure of the stepping motor driving device. Further, it would advantageous if the teaching of the present invention could be applied to existing or conventional driving devices.

To achieve these objects, the present invention provides a hybrid stepping motor including a rotor having a rotor shaft and rotor teeth around the rotor shaft, the rotor teeth including N pole teeth and S pole teeth alternatively arranged in a circumferential direction of the rotor shaft at constant intervals, a stator having twenty main poles (No. 1 to No. 20 main poles) arranged to surround the rotor shaft (or to surround N and S pole teeth) in the circumferential direction of the rotor shaft, each main pole extending toward the rotor shaft in a radial direction of the rotor shaft (or in a direction perpendicular to an axial direction of the rotor shaft), one or more stator teeth being formed at a free end of each main pole to face the rotor teeth directly or indirectly with certain discrepancy, and coils wound around the respective main poles for the excitation of the main poles, the rotor being rotated upon stepping motion of the stepping motor, a magnitude of each stepping motion (stepping pitch) being determined by dividing a rotor tooth pitch by a prescribed number (e.g., ten), characterized in that No. 1–10 main poles and No. 11–20 main poles are arranged such that they faced each other in the radial direction of the rotor shaft, each main pole has a 90-degree relation with a fifth next main pole, and the teeth on each main pole (stator teeth) are arranged such that the positions of the stator teeth of the first ten main poles (No. 1–10 main poles) and those of the second ten main poles (No. 11–20 main poles) are determined by the following expression:

$$Pt \times k + m \times \theta$$

with non-overlapping m being substituted into this expression, where Pt represents the rotor tooth pitch, k represents an arbitrary integer between zero and $K-1$, K represents a number of N (or S) pole teeth, m represents an arbitrary integer between zero and nine and $\theta$ represents the stepping pitch which is obtained by dividing the rotor tooth pitch Pt by ten.

The teeth on the main poles may be arranged such that the position of a tooth on one main pole from a tooth on a fifth next main pole (90-degree spaced one) is given to substitute the largest integer not over K/4 into k and five into m in the above expression of $Pt \times k + m \times \theta$ The value of K may be given by $K = 2 \times J$ where J represents an arbitrary odd number.

The number of the teeth on each main pole may be two or more and these teeth on each main pole may formed symmetrically with respect to the center line of the main pole.

With respect to six successive main poles which define five intervals (angle) between each two adjacent main poles, four intervals may be the same and the remainder may be determined by subtracting the sum of four angles from 90 degrees.

The rotor may have two gears spaced in the axial direction of the rotor shaft. One gear may be N pole gear and the other may be S pole gear, and teeth of these gears may be N and S pole teeth of the rotor, respectively.

The number of N pole teeth and that of S pole teeth are the same. When the rotor is viewed in the axial direction of the rotor shaft, the N and S pole teeth are alternatively arranged in a circle. An S pole tooth is always found at a 90 degree-shifted position in the circumferential direction of the rotor shaft from a certain N pole tooth if the number of N pole teeth is $2 \times j$.

On the other hand, the angular distance between one main pole (e.g., No. 1 main pole) and a fifth next main pole (e.g., No. 6 main pole) is always 90 degrees. Further, four of five successive intervals between six successive main poles (e.g., Nos. 1–6 main poles) are equal to each other. Therefore, if one round is divided into four equal sections (quarter sections), the arrangement of the main poles of these sections are identical to each other (90-degree symmetry). To effectively wind coils around the main poles, a winding machine has five nozzles. These nozzles extend into particular five main pole intervals. These particular intervals are determined such that the five nozzles will not overlap when the four equal sections are overlapped and at least one of five nozzles extends in each quarter section. This provides relatively large clearances between the adjacent nozzles respectively so that sufficient space for the winding operation is ensured. As a result, it is possible to conduct the winding operation to five main poles at the same time. When the angular relation between the winding machine and the stator is shifted by 90 degrees, the nozzles now face (or extend along) next five main poles around which coils have not been wound yet. Then, the winding machine performs the winding operation to these five main poles simultaneously. The same winding operation is repeated twice more. Therefore, four winding operations complete the winding for the twenty main poles.

Since the stator has a 90-degree rotation symmetry and four of five successive intervals between the six successive main poles are equal to each other, the symmetry of the stator around an axis is improved and the balance of the main poles is also improved.

If the coils are wound in a normal direction in one winding operation, the coils are wound In a reverse direction in next winding operation. These operations are repeated once more (i.e., four winding operations are necessary). The coil supplied from each nozzle is not cut during these four winding operations so that one wire is continuously wound around four main poles having the 90-degree relation (e.g., Nos 1, 6, 11 and 16 main poles). This wire defines a lead (five leads are defined in total). If the power is supplied to the lead in the same direction, every five main poles are alternatively excited to opposite polarities (e.g., No. 1 main pole is excited to N, No. 6 main pole is excited to S, No. 11 main pole is excited to N and No. 16 main pole is excited to S). If the power is supplied to the lead in a reverse direction, he polarities of these four main poles are reversed (e.g., N-S-N-S is reversed to S-N-S-N). As the direction of power supply is alternated, the arrangement of polarities of the main poles is alternated, i.e, the pattern of excitation is alternated.

The number of the teeth on each main pole may be one, two or more. However, the following description deals with a case where each main pole has one tooth on its free end for the easier understanding.

As to Nos. 1–10 main poles, the ten stator teeth are arranged to take positions determined by the constraint of $Pt \times k + m \times \theta$ with non-overlapping numbers (0–9) being substituted into m. On the other hand, the N pole teeth take positions of $Pt \times 0, 1, 2, --- $ and $k-1$. If one stator tooth takes a certain position determined by $Pt \times + m \times \theta$, the nearest N pole tooth takes a position of $Pt \times k$. Therefore, the clearance (discrepancy) between the stator tooth and the N pole tooth is $m \times \theta$ Since "m"s do not overlap in Nos. 1–10 main poles, the discrepancy between the stator tooth on a certain main pole and its nearest N pole tooth in a particular direction is $0, \theta, 2\theta, ---$ or $9\theta$. Here, it should be noted that the increasing order of discrepancy does not correspond to the Nos. 1–10 of the main poles. This order will be determined in accordance with a constraint which will be described later. If the main poles (or the stator teeth) are excited in the increasing order of the discrepancy (or the order of "step positions"), ten kinds of excitation pattern appear during the ten excitation operations (one excitation cycle). Specifically, the stator tooth whose discrepancy from its nearest N pole tooth is $\theta$ attracts the N pole tooth in the first excitation. This attraction rotates the rotor $\theta$ and accordingly each discrepancy between the stator tooth and its nearest N pole tooth is reduced by $\theta$ upon one excitation. Then, another stator tooth whose discrepancy from its nearest N pole tooth is $\theta$ (this one previously has the discrepancy of $2\theta$ attracts the N pole tooth in the second excitation. This attraction rotates the rotor $\theta$ again. These actions are repeated ten times in total in one excitation cycle and such an excitation cycle rotates the rotor one rotor tooth pitch Pt.

Since the main poles are arranged in the 90-degree rotation symmetrical relation (the arrangement of five successive main poles in 90 degrees repeats in the circumferential direction) and an N pole tooth is found at a 90-degree position from an S pole tooth, the magnetic fields produced in the first five excitations are respectively opposite those of the second five excitations in one excitation cycle (e.g., the magnetic field in the first excitation is opposite that in the six excitation). It means that the polarities of the rotor teeth and the directions of excitation currents are reversed in the first and second excitations (or first and second half excitations in one excitation cycle). Therefore, if the power is applied to the main poles such that the stators having the 90-degree relation are excited in the reverse polarity and the current is fed in opposite directions in the first and second five patterns of excitation, it is possible to obtain ten patterns of excitation. This means that five input terminals are enough for the ten-phase stepping motor of the present invention. Conventionally, the excitation currents should be applied to the ten main poles (Nos. 1–10 main poles) individually in order to obtain ten patterns of excitation. Thus, the conventional ten-phase stepping motor requires ten input terminals for the excitation. Accordingly, the present invention simplifies the driving or operation of the driving device.

If every four main poles which have the 90-degree interval relation make groups, the twenty main poles of the stepping motor is divided into five groups. Five drive pulses having different phases are applied to the respective groups. In each group, the four main poles are alternatively excited to the opposite polarities (N-S-N-S or S-N-S-N). If one drive pulse (square pulse) is observed, one main pole which has an N polarity during the upper flat portion of the pulse will have an S polarity during the lower flat portion of the pulse and another main pole which has an S polarity during the upper flat portion will have an N polarity during the lower flat portion. In other words, the excitation pattern of one group (four main poles) is reversed in one period of the pulse. When the excitation pattern is reversed, the polarity of the rotor tooth attracted by the same main pole is also reversed. Accordingly, it is possible to obtain two excitation patterns from a single excitation pulse. If the five excitation pulses of different phases are distributed to the five groups of main poles respectively, it is possible to form ten patterns of excitation in one period. In this manner, the ten patterns of excitation (ten-phase excitation) are realized by the five excitation pulses which are conventionally used for the five-phase stepping motor.

If a certain main pole is excited to S polarity in a certain excitation, the stator tooth on this main pole attracts the nearest N pole rotor tooth. In this case, a predetermined number of main poles before and after the subject main pole in the order of increasing (or decreasing) discrepancy may be excited to the same polarity (S) as the subject main pole in the same excitation so that three main poles attract in combination one N pole tooth. In the next excitation, a main pole before the most front main pole is excited to the S polarity while the last main pole is excited to N polarity.

To insure appropriate main pole clearances, a following equation should be satisfied:

$$P = (2Pt - \theta \times n) + Pt \quad (1)$$

where P represents a main pole clearance (interval between two adjacent main poles), Pt represents a rotor tooth pitch, $\theta$ represents a stepping pitch (the stepping pitch is obtained by dividing the rotor tooth pitch by the number of phases, i.e., ten) and n represents an integer between one and nine except five. Here, the dimensions of the clearance and pitch are angular dimensions, not length dimensions.

The sum of main pole clearances for a semicircle of the stator ($\Sigma P$) is given by a following equation:

$$\begin{aligned} \Sigma P &= P \times \phi \\ &= \{(2P - \theta \times n) + Pt\} \times \phi \end{aligned} \quad (2)$$

where O represents a number of main poles within a semicircle (i.e., ten).

The value "n" can be determined arbitrarily, but the balance of the main poles becomes better and the symmetry of the stator is improved as the value of $\Sigma P$ approaches 180 degrees. The equation (2) does not include the case of n=5 since undesirable situation will occur (a case where m (0–9) is used overlappingly).

There is another constraint: to arrange the main poles such that one main pole (e.g., No. 1 main pole) and a fifth next main pole (e.g., No. 6 main pole) in the circumferential direction of the stator always have a 90-degree relationship, the sixth main pole should be at a position 90 degrees away from the first main pole while the first to fifth main poles (e.g., Nos. 1–5 main poles) are positioned at the above-mentioned main pole intervals Ps respectively. For this constraint, the interval between the fifth and sixth main poles $P_{90}$ is not equal to the common main pole interval P. In this manner, four of five successive intervals have the values of "P" respectively and one has a value of $P_{90}$. This arrangement repeats four times in a circumferential direction of the stator. If the value n is determined to make the value of $\Sigma P$ 180 degrees as close as possible, the difference between $P_{90}$ and P is reduced.

If the main poles are arranged in line with the above mentioned constraints, the position of No. 2 main pole relative to No. 1 main pole has discrepancy of n step pitches since the position of the stator tooth on the second main pole is given by $2Pt-\theta\times n)+Pt$, as compared with a case where the main poles are arranged at intervals of 3Pt (no discrepancy in this case). This discrepancy (n step pitches) is accumulated in the order of main poles. At No. 6 main pole, since the position of No. 6 main pole is always 90 degree-position from No. 1 main pole, a change of $P_{90}-P$ is made to the accumulated discrepancies in addition to a common discrepancy. From No. 7 main pole, the discrepancy of n step pitches is only accumulated. Here, it should be noted that every time the accumulated discrepancies exceed Pt, Pt is subtracted from the accumulated discrepancies Since Pt is equal to $10\times\theta$ and n is an integer between 1 and 9 except 5, the Pt-subtracted discrepancies at Nos. 1–10 main poles do not take the same value Namely, the Pt-subtracted discrepancies at Nos 1–10 main poles are 0, $\theta$, $2\theta$, $3\theta$, - - - and $9\theta$ respectively. However, it should be noted that the order of these values do not correspond to the Nos. of the main poles In other words, the ten main poles having ten kinds of discrepancy respectively are arranged in random By exciting the main poles in the order of increasing discrepancy, it is possible to rotate the rotor stepping pitch by stepping pitch thereby realizing the stepping motion.

The tooth portion and the trough portion of the stator tooth may have the same length and those of the rotor tooth may have the same length respectively.

BRIEF DESCRIPTION OF THE DRAWINGS

FIG. 3 is an exploded view of the hybrid stepping motor of FIG. 1 along a peripheral direction of the motor to show a positional relation between stator teeth and rotor teeth (N pole teeth);

DETAILED EXPLANATION OF THE PREFERRED EMBODIMENTS

Now, preferred embodiments of the present invention will be described with the accompanying drawings.

Figure 1:
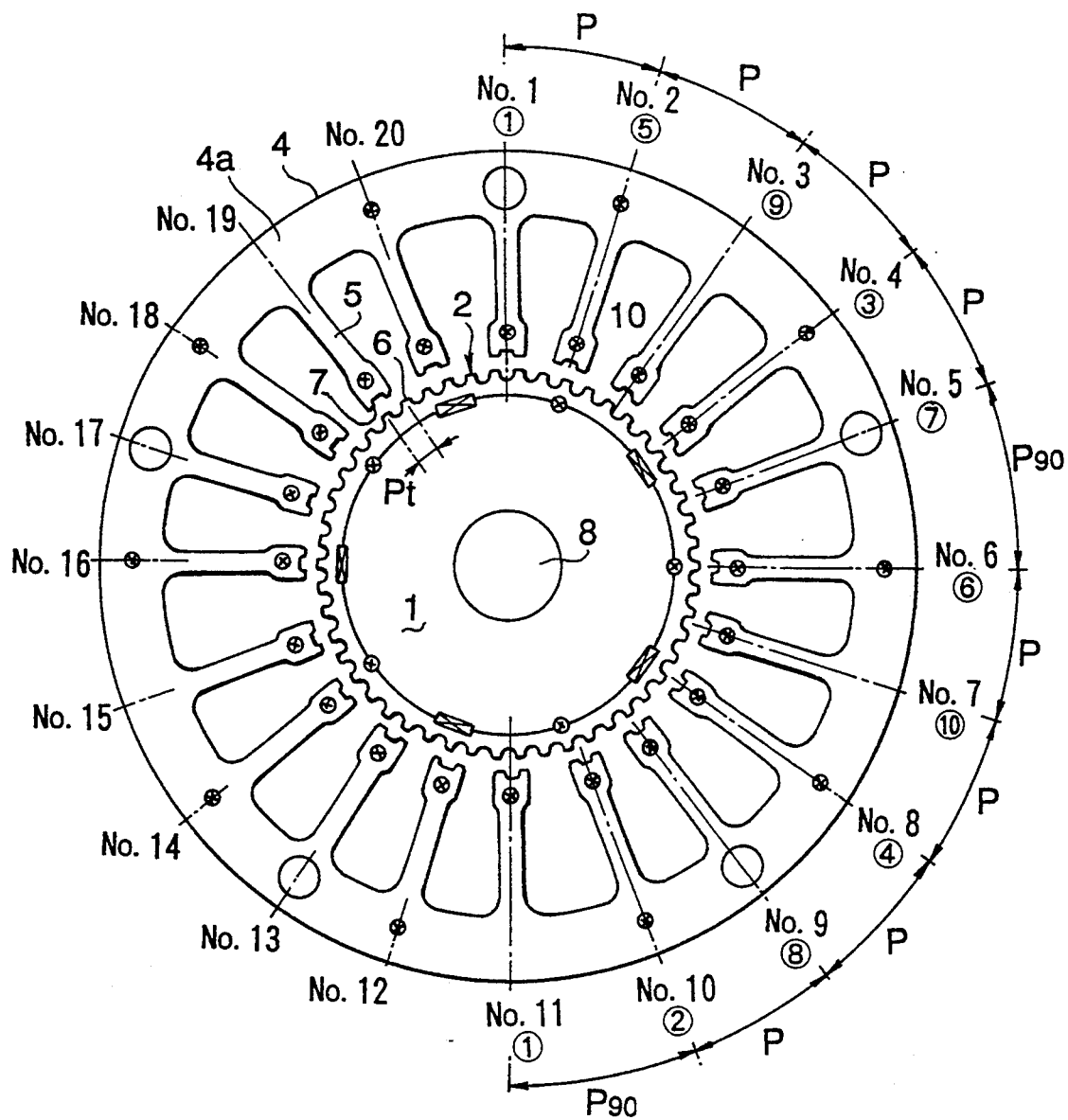
FIG. 1 shows a sectional view of a hybrid stepping motor, as taken in a plane perpendicular to a rotation axis of the motor (or a plane perpendicular to a longitudinal direction of a rotor), according to the present invention.
Figure 2:
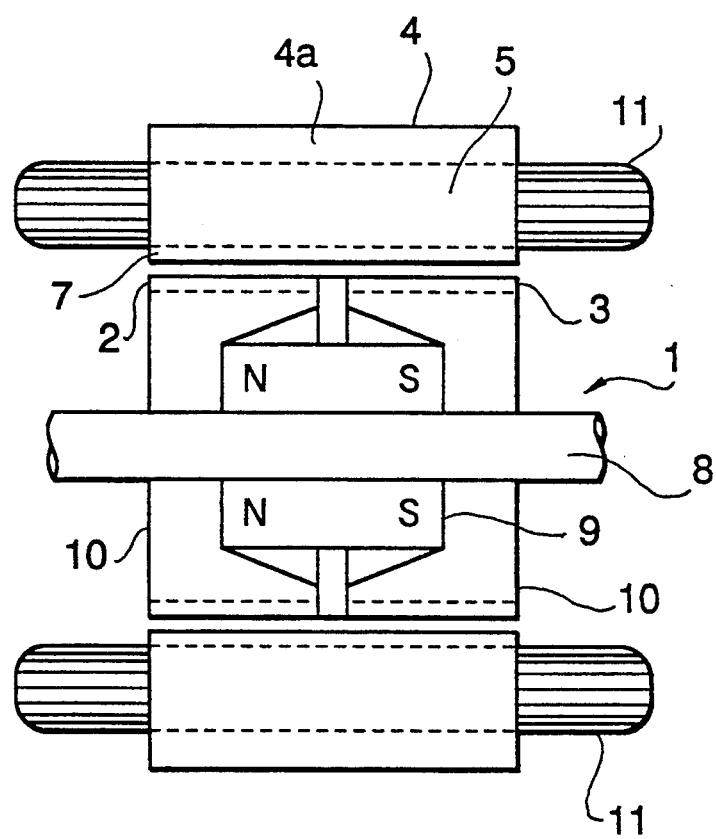
FIG. 2 is a sectional view of the hybrid stepping motor of FIG. 1 along the rotation axis.

Referring to FIG. 1, illustrated is a ten-phase hybrid stepping motor having twenty main poles according to the present invention. Around a rotor 1, fifty N pole teeth 2 are arranged in the circumferential direction of the rotor 1 at constant intervals as shown in FIG. 1. The N pole teeth define an N pole gear 10. Likewise, fifty S pole teeth are arranged around the rotor 1 at constant intervals behind the N pole teeth (not shown in FIG. 1). The S pole teeth are arranged in a plane parallel to the drawing sheet, and they are positioned so as not to overlap the N pole teeth as viewed in a vertical direction to the drawing sheet (or as viewed in an axial direction of a rotor shaft 8). The S pole teeth also define an S pole teeth gear 10 (FIG. 2). The S pole teeth are not illustrated in FIG. 1 for the simplification. The tooth pitch Pt of the gear 10 (tooth pitch of the N pole teeth gear and that of the S pole teeth gear) is 7.2 degrees (dividing 360 by 50). The pitch between N and S pole teeth is a half of 7.2 degrees (3.6 degrees). If one N pole tooth 2 is observed in the axial direction of the rotor, there is always an S pole tooth 3 (FIG. 2) at a 90-degree relation in the circumferential direction of the stator (not shown).

As shown in FIG. 1, a stator 4 has a hollow cylindrical body 4a and twenty main poles 5 extend from an inner wall of the cylindrical body 4a radially inward (or toward the rotor shaft 8). Each main pole 5 has two teeth 7 (stator teeth) at its free end. The teeth 7 have the same tooth pitch as the rotor teeth 6. The two teeth 7 on each main pole 5 are symmetrical with respect to a center line of the main pole (single dot line). A coil is wound around each main pole 5 to excite the main pole (or stator teeth 7).

The arrangement of the main poles 5 is determined as follows: if arbitrary six successive main poles are observed, first and sixth main poles always have a 90-degree relation, four of five intervals between each two adjacent main poles 5 are determined by the equation (1) and one interval is determined by subtracting the total of four intervals from 90 degrees.

Referring to FIG. 2, the rotor 1 has a permanent magnet 9 and two gears 10. The permanent magnet 9 is cylindrical or ring-shaped so that the rotor shaft 8 extends through its center opening. One side (left side in the illustration) of the permanent magnet 9 is N pole and the other side is S pole. The gears 10 sandwich the permanent magnet 9 in the axial direction of the rotor shaft 8. As mentioned earlier, each gear 10 has fifty teeth (S or N pole teeth) on its outer periphery at constant tooth pitches. The gears 10 have a discrepancy of half pitch as viewed in the axial direction of the rotor shaft 8. The gear 10 is formed from layers of silicon steel plate. A magnetic field of the permanent magnet 9 is appropriately guided by the gears 10 in a manner such that one gear 10 has an N polarity and the other gear 10 has an S polarity. If the N and S pole gears are observed in the axial direction of the rotor shaft 8, an N pole tooth 2 and an S pole tooth 3 are always found at a 90-degree relation.

Referring back to FIG. 1, a top main pole is called No.1 main pole and its angular position is called zero degree position in this specification. Accordingly, the N pole teeth 2 position at 3.6, 10.3, - - -, 90, - - - degree positions (and the S pole teeth (not shown in FIG. 1) position at 0, 7.2, - - - degree positions.) These positions of N pole teeth are illustrated as a number line in FIG. 3 (shown is an exploded view of N pole teeth gear 10 in the circumferential direction of the gear 10).

The stator 4 is made from layers of silicon steel plate. Each silicon plate has a sectional view shown in FIG. 1 and is molded by a die cutting method with a press. The body 4a of the rotor 4 is cylindrical and houses the rotor 1 (FIG. 2). Each main pole 5 has a prescribed length in its longitudinal direction (radial direction of the rotor 1) and a prescribed width in the axial direction of the rotor shaft 8 (FIG. 2). The free end of the main pole 5 faces the tooth or teeth of the gear 10 as shown in FIG. 1. A pitch of two teeth (stator teeth) 7 on each main pole 5 is 7.2 degrees which is the same as that of rotor tooth pitch Pt. The length of the tooth and that of the valley of the stator tooth are equal to each other (3.6 degrees) and the length of the tooth and that of the valley of the rotor tooth are equal to each other (3.6 degrees) in this embodiment. The width of a stem portion of the main pole 5 is smaller than that of the free end of the main pole 5. A coil 11 (FIG. 2) is wound around the stem portion of the main pole 5.

As indicated in FIG. 1, the top main pole is called "No. 1" main pole in this specification, and other main poles are called No. 2, 3, - - - and 20 main poles in turn in the clockwise direction. In addition, the top and eleventh main poles are called "first pair" of main poles (1), and other main poles facing each other in a radial direction of the rotor are called "fifth" (5), "ninth" (9), "third" (3), "seventh" (7), "sixth" (6), "tenth" 10, "fourth" (4), "eighth" (8), and "second" pairs (2) of main poles in turn the clockwise direction in this particular specification. This numbering will be explained later.

This embodiment is a case as obtained by substituting $Pt=7.2$, $\theta=0.72$, $n=6$ and $O=10$ into the equations (1) and (2). Therefore, the equations (1) and (2) are expressed as follows:

$$P = (7.2 \times 2 - 0.72 \times 6) + 7.2 \tag{1a}$$
$$= 17.28$$

$$\Sigma P = 17.28 \times 10 \tag{2a}$$
$$= 172.8$$

With the results of these equations, Nos. 1–5 and 6–10 main poles 5 are arranged at 17.28 degree intervals. Various data of these main poles are shown in Table I. Specifically, the angular position of the first main pole is 0 degree, that of the second main pole is 17.28 degrees, that of the third main pole is 34.56 degrees, that of the fourth main pole is 51.84 degrees and that of the fifth main pole is 69.12 degrees. The angular position of the sixth main pole is always 90 degrees so that the interval between Nos. 5 and 6 main poles is 20.88 degrees ($P_{90}$). The sixth to tenth main poles are arranged at the constant intervals (17.28 degrees) and the eleventh main pole is located at a 180-degree position as viewed from the first main pole (i.e., the interval between Nos. 10 and 11 main poles is 20.88 degrees). Namely, the positions of the sixth to eleventh main poles are 90, 107.28, 124.56, 141.84, 159.2 and 180 degrees, respectively. The same arrangement continues in the left half of the stator of FIG. 1 in the clockwise direction. The interval between the fifth and sixth main poles and that between the tenth and eleventh main poles are both 20.88 degrees ($P_{90}=20.88$ degrees). This interval (20.88 degrees) is larger than the interval between other two adjacent main poles (17.28 degrees) by 3.6 degrees. In Table I, Nos. 40 and 1 are assigned to the teeth on the first main pole, Nos. 2 and 3 are assigned to the teeth on the second main pole, Nos. 4 and 5 are assigned to the teeth on the third main pole and so on. A clearance between a stator tooth on one main pole and a stator tooth on next main pole (tooth clearance) is 10.08 degrees or 13.68 degrees.

TABLE I

| M.P. No. | Posi | Tooth No. | Tooth Posi | Pair No. (Phase) | Dis From N | Dis From S | M.P. Interval | Tooth Clr |
|---|---|---|---|---|---|---|---|---|
| 1 | 0.00 | 40 | 356.40 | 1 | 0.00 | 3.6 | | |
| | | 1 | 3.60 | | | | | |
| | | | | | | | 17.28 | 10.08 |
| 2 | 17.28 | 2 | 13.68 | 5 | 2.88 | 6.48 | | |
| | | 3 | 20.88 | | | | | |
| | | | | | | | 17.28 | 10.08 |
| 3 | 34.56 | 4 | 30.96 | 9 | 5.76 | 2.16 | | |
| | | 5 | 38.16 | | | | | |
| | | | | | | | 17.28 | 10.08 |
| 4 | 51.84 | 6 | 48.24 | 3 | 1.44 | 5.04 | | |
| | | 7 | 55.44 | | | | | |
| | | | | | | | 17.28 | 10.08 |
| 5 | 69.12 | 8 | 65.52 | 7 | 4.32 | 0.72 | | |
| | | 9 | 72.72 | | | | | |
| | | | | | | | 20.88 | 13.68 |
| 6 | 90.00 | 10 | 86.40 | 6 | 3.6 | 0.00 | | |

TABLE I-continued

| M.P. No. | Posi | Tooth No. | Tooth Posi | Pair No. (Phase) | Dis From N | Dis From S | M.P. Interval | Tooth Clr |
|---|---|---|---|---|---|---|---|---|
| | | 11 | 93.60 | | | | | |
| | | | | | | | 17.28 | 10.08 |
| 7 | 107.28 | 12 | 103.68 | 10 | 6.48 | 2.88 | | |
| | | 13 | 110.88 | | | | | |
| | | | | | | | 17.28 | 10.08 |
| 8 | 124.56 | 14 | 120.96 | 4 | 2.16 | 5.76 | | |
| | | 15 | 128.16 | | | | | |
| | | | | | | | 17.28 | 10.08 |
| 9 | 141.84 | 16 | 138.24 | 8 | 5.04 | 1.44 | | |
| | | 17 | 145.44 | | | | | |
| | | | | | | | 17.28 | 10.08 |
| 10 | 159.12 | 18 | 155.52 | 2 | 0.72 | 4.32 | | |
| | | 19 | 162.72 | | | | | |
| | | | | | | | 20.88 | 13.68 |
| 11 | 180.00 | 20 | 176.40 | 1 | 0.00 | 3.60 | | |
| | | 21 | 183.60 | | | | | |

"M.P." stands for Main Pole, "Posi" stands for Position (angular position), "Dis From N" stands for Discrepancy From nearest N pole tooth, "Dis From S" stands for Discrepancy From nearest S pole tooth and "Clr" stands for Clearance.

Since the main poles 5 are arranged in a manner as described above, the positions of the two stator teeth 7 (Tooth Position) on No. 1 main pole are 356.4 and 3.6 degrees as shown in Table I. The angular distance between one stator tooth (e.g., No. 1 tooth) and a second next stator (e.g., No. 3 tooth) is 17.38 or 20.88 degrees (same as the main pole interval P or $P_{90}$) and the tooth clearance between one stator tooth on one main pole (e.g., No.1 tooth on No. 1 main pole) and one stator tooth on next main pole (e.g., No. 2 tooth on No. 2 main pole) is 10.08 or 13.68 degrees. In the following, a pair of teeth on one main pole (e.g., Nos. 40 and 1 teeth on No. 1 main pole) is referred to as No. X stator teeth (e.g., No. 1 stator teeth).

Since the stator teeth 7 are arranged in a manner as described above, the stator teeth and the rotor teeth (N pole teeth) have a relation as shown in FIG. 3. (In FIG. 3, the center line of No. 1 main pole defines zero degree.) Specifically, the N pole teeth are arranged at 3.6, 10.8, 18.0, - - - degree positions and the stator teeth are arranged at 3.6, 13.68, 20.88, - - - degree positions. As illustrated, therefore, the N pole teeth and the stator teeth do not always face directly each other. Specifically, No. 1 stator tooth (3.6) directly faces the nearest N pole tooth (3.6) of the rotor but No. 2 stator teeth (13.68 and 20.28) and do not directly face the nearest N pole tooth (10.8 and 18.0) ("nearest" in the counterclockwise direction or left direction in FIG. 3) (there is a 2.88-degree discrepancy: 13.36−10.8=2.88). The magnitude of the discrepancy in the clockwise direction is generally accumulated by 2.88 degrees. Namely, the discrepancy at No. 3 stator teeth is 5.76 (2.88+2.88) degrees and that at No. 4 stator teeth is 8.64 (5.76+2.88) (However, the discrepancy is measured from the "nearest" N pole tooth and the N pole tooth has a tooth pitch of 7.2 degrees. Thus, the discrepancy at No. 4 stator teeth is actually 1.44 degrees (8.64−7.2)) The discrepancy at No. 5 is 4.32 degrees (1.44+2.88=4.32). The discrepancy at No. 6 stator teeth is determined with another constraint being taken in account. Specifically, since the main pole interval between Nos. 5 and 6 main poles is 20.88 degrees which is different from that between other main poles (17.28 degrees) by 3.6 degrees, this 3.6 degrees should be added to the discrepancy. Accordingly, the discrepancy at No. 6 stator teeth is 3.6 (4.32+2.88+3.6−7.2=3.6). In summary, the magnitudes of the discrepancy from the nearest N pole teeth of Nos. 1–11 stator teeth in the clockwise direction are 0, 2.88, 5.76, 1.44, 4.32, 3.6, 6.48, 2.16, 5.04, 0.72 and 0 degrees in the order of the main poles, as shown in Table I.

If numbers from 1 to 10 are assigned to the stator teeth in the increasing order of the magnitude of the discrepancy, (1) is assigned to No. 1 stator teeth, (5) is assigned to No. 2 stator teeth, (9) is assigned to No. 3 stator teeth, (3) is assigned to No. 4 stator teeth, (7) is assigned to No. 5 stator teeth, (6) is assigned to No. 6 stator teeth, (10) is assigned to No. 7 stator teeth, (4) is assigned to No. 8 stator teeth, (8) is assigned to No. 9 stator teeth and (2) is assigned to No. 10 stator teeth. These numbers indicate the increasing order of the discrepancy and are identical to the encircled numbers in FIG. 1 ("Pair Number (Phase)" in Table I). On the other hand, the discrepancy of the stator teeth from the S pole teeth in the clockwise direction is shifted (incremented or decremented) by 3.6 degrees from that of the stator teeth from the N pole teeth, as shown in Table I. Namely, the discrepancy of the stator teeth from the S pole teeth is 0 at No. 6 stator teeth, 0.72 degree at No. 5 stator teeth, 1.44 degrees at No. 9 stator teeth and so on. Therefore, ⑥ corresponds to the smallest discrepancy, the discrepancy increases in the order of ⑦, ⑧, ⑨, 10 , ①, ②, ③, ④ and ⑤.

Next, the winding operation to the stator 4 will be explained.

Figure 4:
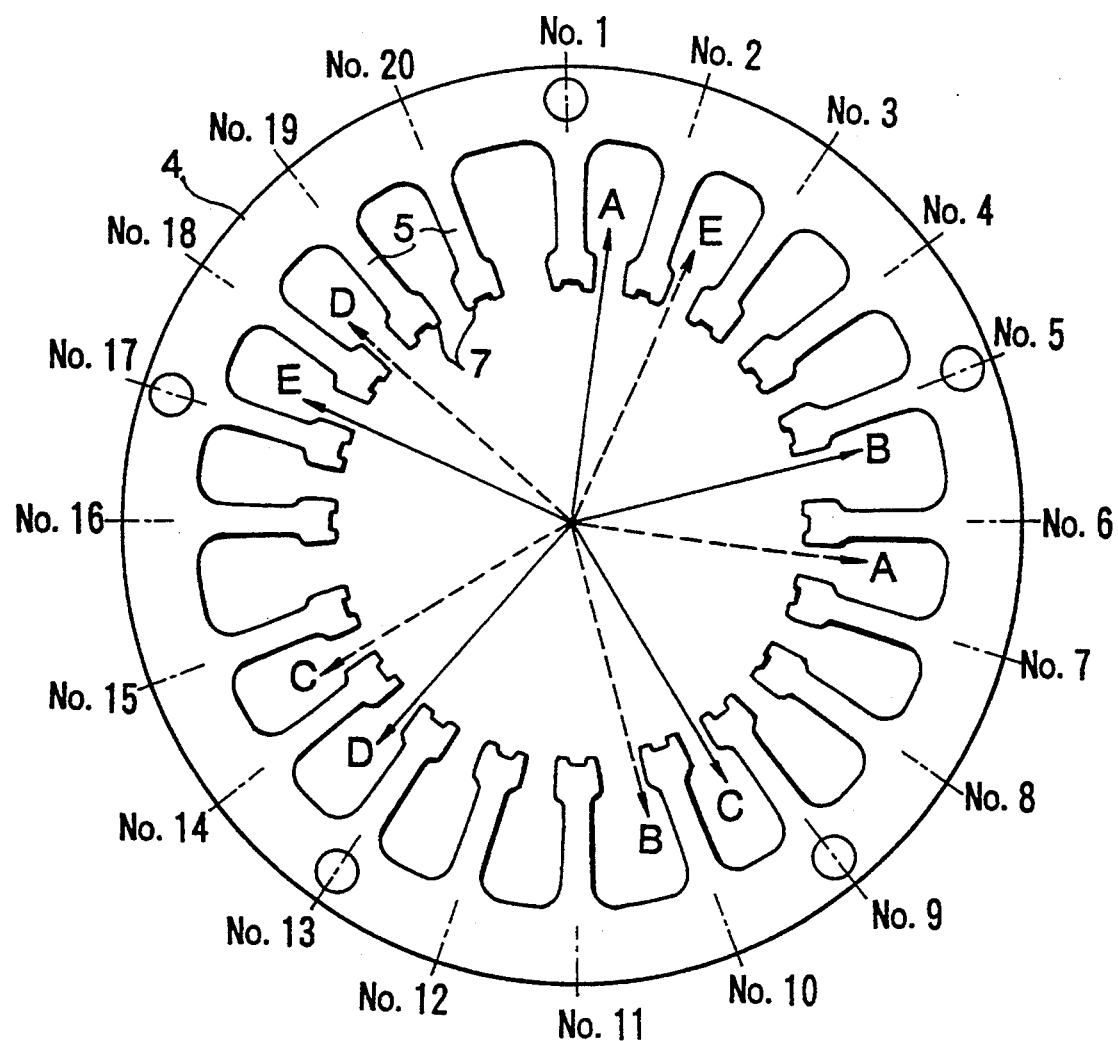
FIG. 4 illustrates nozzles for wind coils around main poles of the stator of the hybrid stepping motor of FIG. 1.

A winding machine (not shown) for winding a coil around each main coil 5 has five nozzles for feeding wires as shown in FIG. 4. 8. The five nozzles are represented by five solid-line arrows A–E in FIG. 4. Each nozzle can move in the direction as indicated by the arrow A–E and rotate around the main pole while feeding the wire. In order to insert the nozzles into the intervals between the two adjacent main poles (main pole interval), it is disadvantageous if the clearance between the stator teeth on the adjacent main poles (tooth clearance) is small. In this embodiment, the clearances between two adjacent main poles are almost equal to each other (17.28 or 20.88 degrees) and the smallest tooth clearance is 10.08 degrees, as shown in Table I. This means that a sufficient clearance is ensured to each nozzle for the winding operation to the stator having twenty main poles.

The winding machine has five nozzles extending radially, as illustrated in FIG. 4. First, the nozzles A, B, C, D and E are directed to extend along Nos. 1, 5, 9, 13 and 17 main poles, respectively. This arrangement prevents the nozzles from contacting each other during the winding operation. Further, when the five nozzles A–E are rotated 90, 180 and 270 degrees from the illustrated positions, the nozzles A–E do not overlap the positions at which the nozzles are previously located. The broken-line arrows A–E show the nozzles after a 90-degree rotation.

Figure 5A:
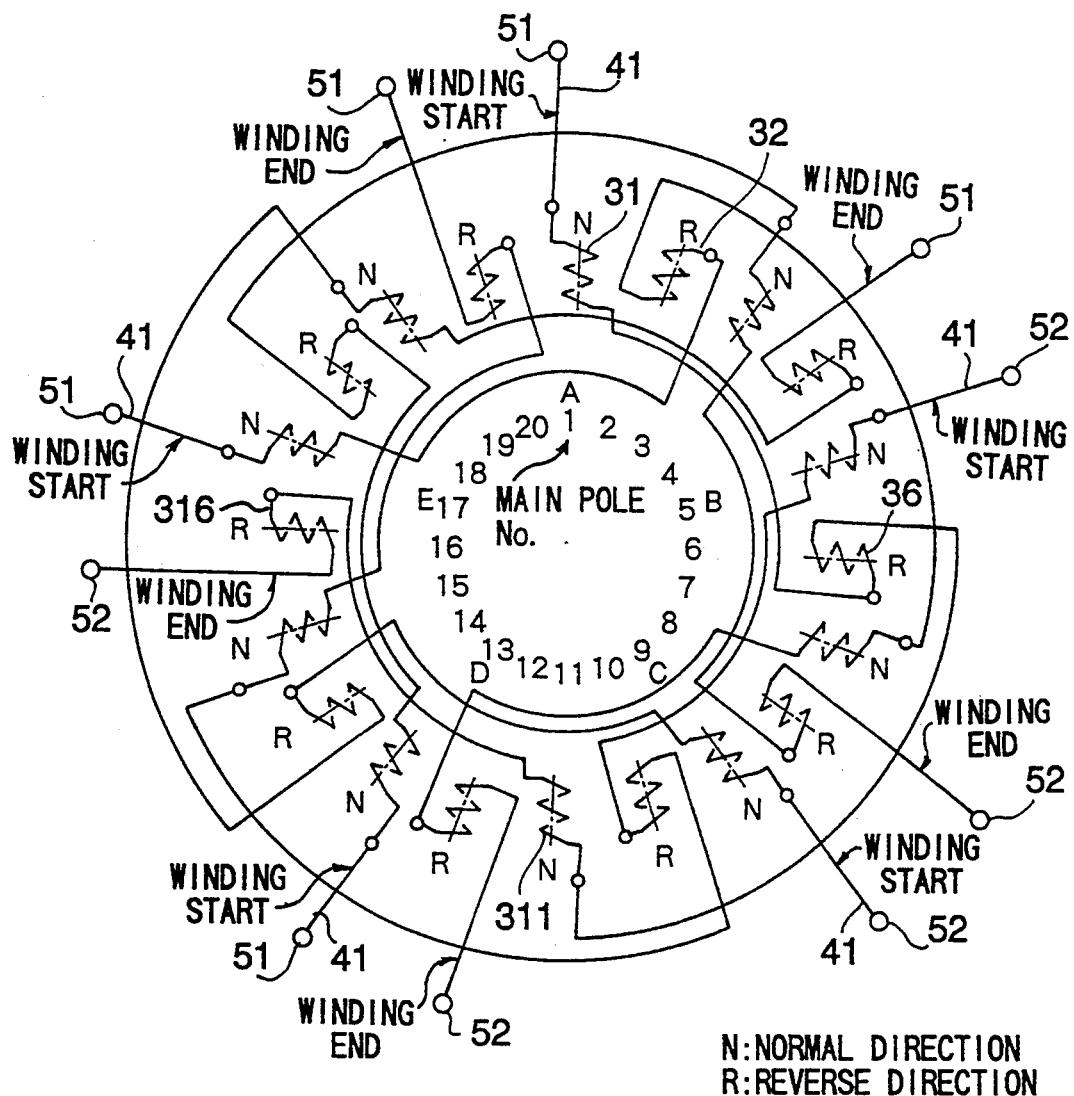
FIGS. 5A and 5B are a set of views illustrating a concept of wiring method according to the present invention.

After simultaneously winding the coils around Nos. 1, 5, 9, 13 and 17 main poles in a normal direction respectively, the winding machine or the stator 4 is rotated 90 degrees while the feeding of the wires (coils) from the nozzles are maintained. As a result, the nozzles A–E are now arranged along Nos. 6, 10, 14, 18 and 2 main poles as indicated by the broken-line arrows in FIG. 4. In this situation, the winding machine feeds the wires around these five main poles simultaneously in a reverse direction. Then, the winding machine or the stator is rotated 90 degrees and the wires (coils) are wound around Nos. 11, 15, 19, 23 and 7 main poles in the normal direction. Finally, the wires are wound around Nos. 6, 10, 14, 18 and 2 main poles in the reverse direction to finish the winding operations to the twenty main poles. As understood from the above, the winding operations are repeated four times. FIG. 5(A) illustrates the stator and the rotor after such winding operations. Two free ends of each coil are used as input terminals for excitation power.

Figure 5B:
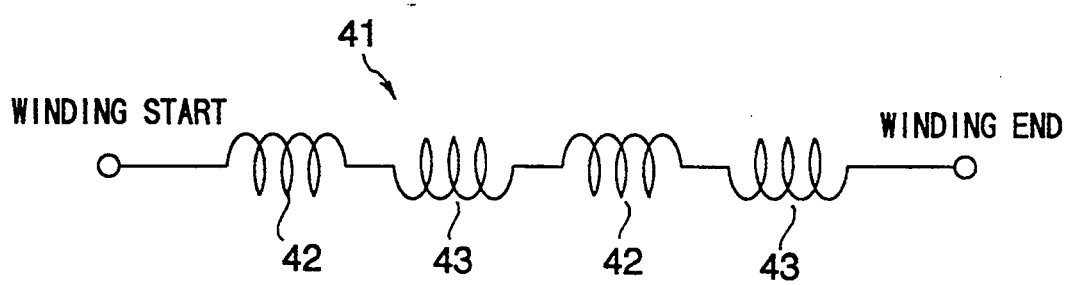

In FIG. 5(A), each main pole has its own coil. In this embodiment, the winding direction of the coil 31 around No. 1 main pole is referred to as "normal" direction. Accordingly, the winding direction of the coil 32 around No. 2 main pole is referred to as "reverse" direction. The normal and reverse winding directions alternatively appear in the following main poles, i.e., Nos. 3 (normal), 4 (reverse), 5 (normal) - - - . The coils of every fifth next main poles are connected to each other in series. For example, one end of the coil 31 of No. 1 main pole is connected with one end of a coil 36 of No. 6 main pole, the other end of the coil 36 is connected with one end of the coil 311 of No. 11 main pole and the other end of the coil 311 is connected with one end of a coil 316 of No. 16 main pole. The other end of the coil 31 of No. 1 main pole and the other end of the coil 316 of No. 16 main pole are drawn outside as "winding start" and "winding end" respectively. In this manner, five leads 41 are created for the twenty coils (or twenty main poles 5). FIG. 5(B) depicts one lead, i.e., a series of four coils. Numeral 42 represents a coil wound in the normal direction and numeral 43 represents a coil wound in the reverse direction. As illustrated, the normally wound coils 42 and the reversely wound coils 43 alternatively appear from a "winding start" to a "winding end" in a single lead 41.

In the above explanation, the first coil 42 of the lead 41 is wound in the normal direction. However, the first may be wound in the reverse direction and the second coil may be wound in the normal direction. Further, the five nozzles wind the coils in the same direction in a single winding operation, but some of them may feed the wire in the normal direction while the remainder may feed the wire in the reverse direction in a single winding operation. In addition, the five coils are simultaneously wound around a group of particular five main poles (e.g. Nos. 1, 5, 9, 13 and 17 main poles) in a single winding operation and the similar winding operations are repeated three times as all the nozzles are rotated 90 degrees in the same direction in the embodiment. However, the nozzle A may start winding from No. 1 main pole, the nozzle B may start winding from No. 20 main pole, the nozzle C may start winding from No. 4 main pole, the nozzle D may start winding from No. 13 main pole and the nozzle E may start winding from No. 17 main pole. In the following description, the winding operation starts from these main poles and the nozzles A, D and E are rotated clockwise whereas the nozzles B and C are rotated counterclockwise in the following description. Thus, a starting point 51 and an ending point 52 of the lead 41 in FIG. 5(A) do not always coincide with "winding start" and "winding end" in FIG. 5(B).

Next, connections of the five leads will be explained.

Figure 6A:
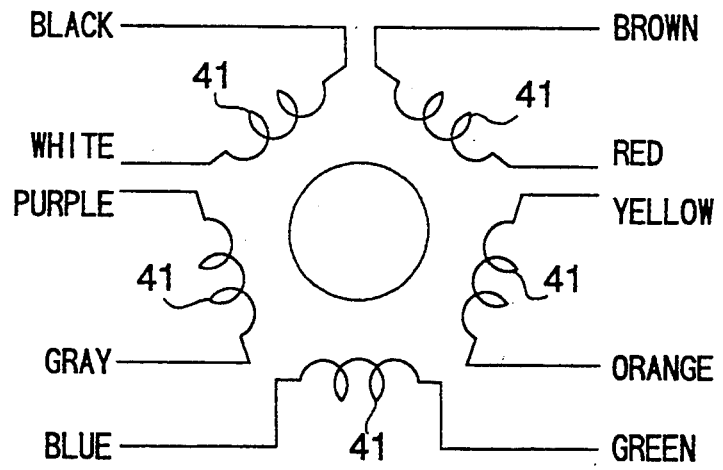
FIGS. 6A, 6B and 6C are a set of views illustrating circuit diagrams of leads.
Figure 6B:
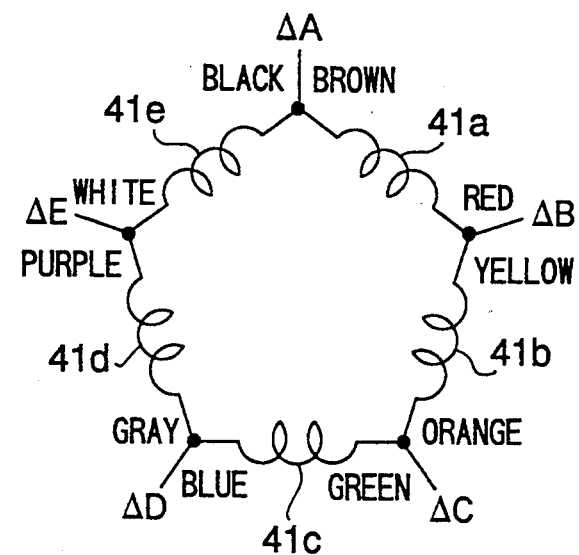
Figure 6C:
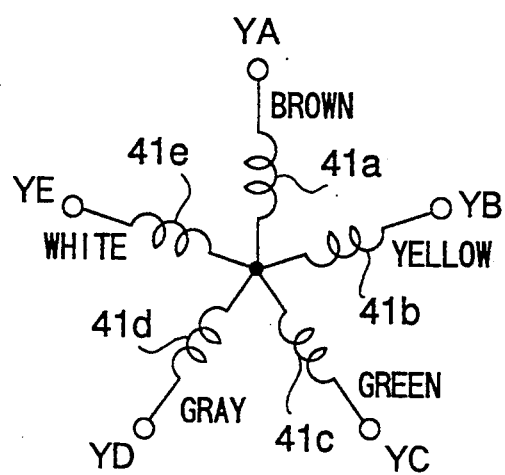

Referring to FIG. 6(A), each coil around a circle does not represent a single coil but the lead 41. Further, FIG. 6(A) does not illustrate the relative relationship between the five leads 41. FIG. 6(A) shows a fundamental wiring. A drive signal may be input to each lead 41. Each lead 41 has two inputs colored black, red, yellow, orange, green, blue, gray, purple or white. The leads 41 of FIG. 6(A) may be wired as shown in FIG. 6(B). In other words, adjacent ends of each two adjacent leads 41 may be connected to each other. In such a case, an excitation power may be applied to connections ΔA to ΔE. Another example is shown in FIG. 6(C). One end of each lead 41 may be collected to one point (center) and the excitation power may be applied to the other ends YA to YE of the leads 41 respectively. In the following, the wiring of FIG. 6(B) is referred to as delta (Δ) connection and that of FIG. 6(C) is referred to as Y connection.

Figure 11A:
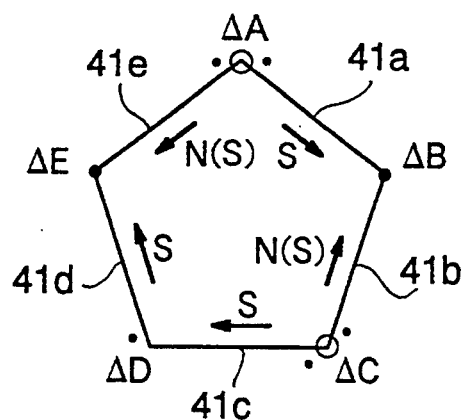
FIG. 11 is a set of views showing circuits to illustrate voltage, current and polarity in delta connection and Y connection respectively.
Figure 11B:
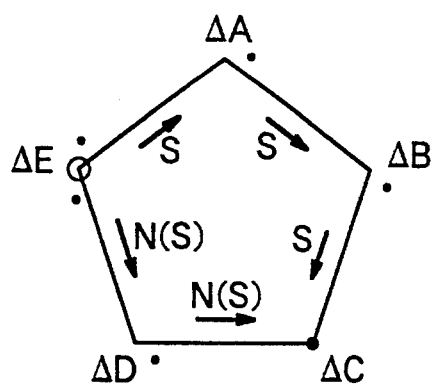
Figure 11C:
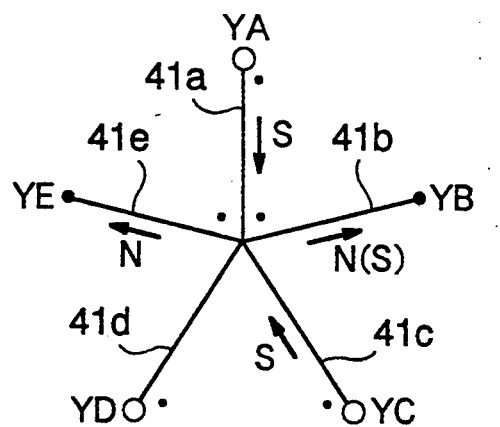

In the delta connection or Y connection, the wiring start and end of the lead 41 may become any arbitrary connection points. FIGS. 11(A) and 11(B) are examples derived from FIG. 6(B) (symbols for the leads are eliminated from FIGS. 6(B)) and FIG. 11(C) is an example derived from FIG. 6(C). Specifically, FIG. 11(A) shows a wiring used for a Δ4-5P excitation or a Δ4P excitation. In FIG. 11(A), one end of the line 41 accompanied by a dot represents a starting point (lead start). As illustrated, there are two lead starts at the connections ΔA and ΔC, respectively. In FIG. 11(C), YA, YC and YD represent the lead starts while YB and YC represent the lead ends.

Next, the operation will be explained.

A first way of operation (first driving method) is to simply apply the ten kinds (or phases) of drive pulse to the main poles which need exciting. Here, the ten phases proceed in the order of main poles ①, ②, ③, ④, - - - . Table II shows the patterns (or combinations) of the excitation at respective phases. When the stator and the rotor are in the positions shown in FIG. 1, the main poles of ① (Nos. 1 and 11 main poles) are excited to S polarity and the main poles of ⑥ (Nos. 6 and 16 main poles) are excited to N polarity. Therefore, the N pole teeth of the rotor near the main poles of ① are attracted by the stator teeth on the main poles of ① and these N pole teeth directly face the stator teeth on the main poles of ①. Likewise, the S pole teeth of the rotor near the main poles of ⑥ are attracted by the stator teeth on the main poles of ⑥ they directly face each other. This situation is referred to as "phase 1" in Table II. At this point, the main poles having the smallest discrepancy from the nearest N pole tooth are the main poles of ② (Nos. 10 and 20 main poles) and the main poles having the smallest discrepancy from the nearest S pole tooth are the main poles of ⑦ (Nos. 5 and 15 main poles).

TABLE II

| MAIN POLE | PHASE | | | | | | | | | |
|---|---|---|---|---|---|---|---|---|---|---|
| | 1 | 2 | 3 | 4 | 5 | 6 | 7 | 8 | 9 | 10 |
| ① | S | | | | | N | | | | |
| ⑥ | N | | | | | S | | | | |
| ② | | S | | | | | N | | | |
| ⑦ | | N | | | | | S | | | |
| ③ | | | S | | | | | N | | |
| ⑧ | | | N | | | | | S | | |
| ④ | | | | S | | | | | N | |
| ⑨ | | | | N | | | | | S | |
| ⑤ | | | | | S | | | | | N |
| ⑩ | | | | | N | | | | | S |

In phase 2 of Table II, the main poles ② which have the smallest discrepancy from the nearest N pole tooth are excited to S polarity and the main poles ⑦ which have the smallest discrepancy from the nearest S pole tooth are excited to N polarity. As a result, the N and S pole teeth near the main poles ② and ⑦ are attracted by the main poles ② to rotate the rotor 0.72 degree in the clockwise direction. Accordingly, the magnitudes of the discrepancy of the stator teeth in this situation are given by subtracting 0.72 from the values shown in Table I, and the main poles ③ and ⑦ now have the smallest discrepancies from the nearest N and S pole teeth, respectively.

After the phase 2, the stator teeth are excited to S polarity in the order of ③, ④ and ⑤ while the stator teeth are excited to N polarity in the order of ③, ⑨ and 10, respectively. As a result, the rotation of 6.48 (=0.72×9) degrees in the clockwise direction is made from phase 1 to phase 10. In phase 11 (not shown in Table II), the situation in terms of excitation returns to the situation of phase 1. i.e., the rotation of 7.2 (=0.72×10) degrees in total is made in the clockwise direction.

In a second driving method, not only a subject main pole (main pole which needs exciting) but the main poles at the step positions before and after the subject main pole are excited to the same polarity in one phase (or at one step position) (e.g., if the subject main pole is ① and excited to S polarity, the main poles ② and 10 are also excited to S polarity). In next phase, a main pole of next step position (e.g., main pole ⑨) is excited to the same polarity (S) while the last main pole (e.g., main pole ②) is excited to the opposite polarity (N). Here, it should be noted that the phases proceeds in the order of main poles ①, 10 , ⑨, ⑧, ⑦, - - -, which is the opposite the first driving method. This means that the rotational direction of the rotor is reversed.

In the first phase, the main poles ⑨, 10 , ①, ② and ③ may be excited to S polarity, and in the next phase, the main poles ⑧, ⑨, 10 , ①, ② may be excited to S polarity while the main pole ③ may be excited to N polarity.

Figure 7:
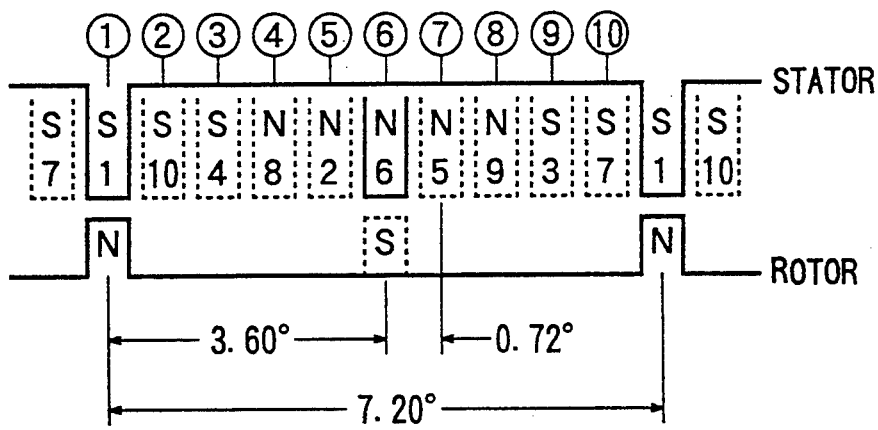
FIGS. 7A–7J are a set of exploded views showing positional relations between the rotor teeth and stator teeth in the order of excitation.
Figure 7:
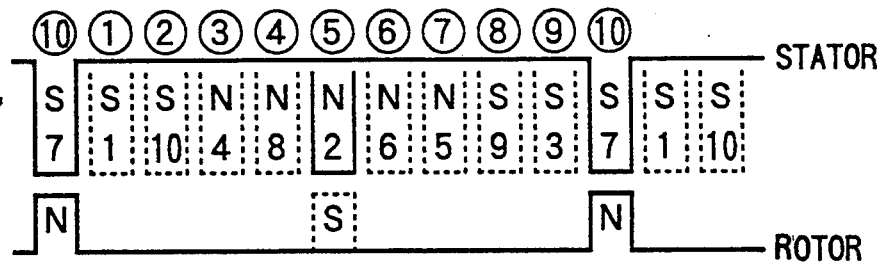
Figure 7:
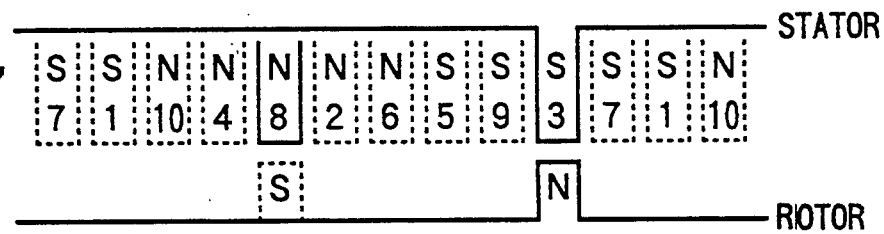
Figure 7:
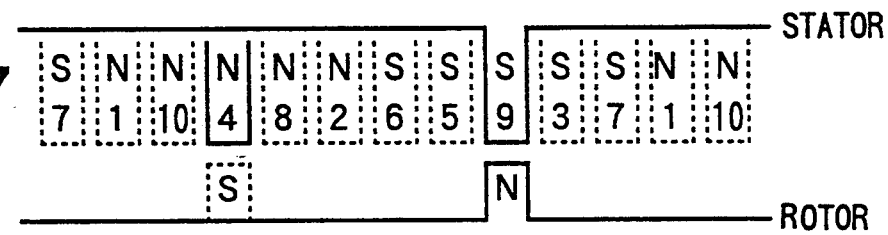
Figure 7:
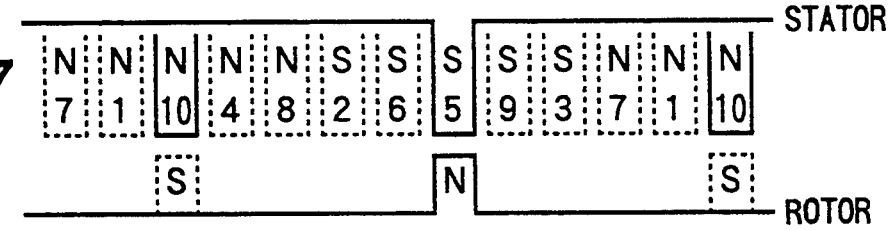
Figure 7:
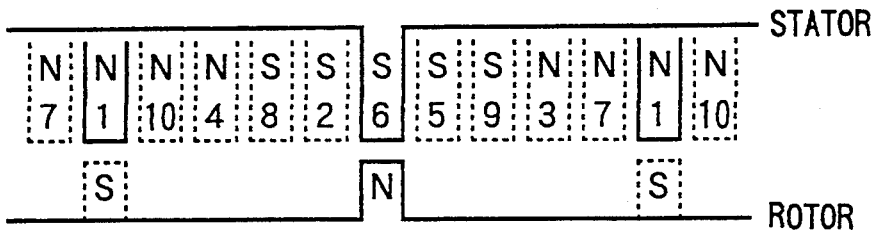
Figure 7:
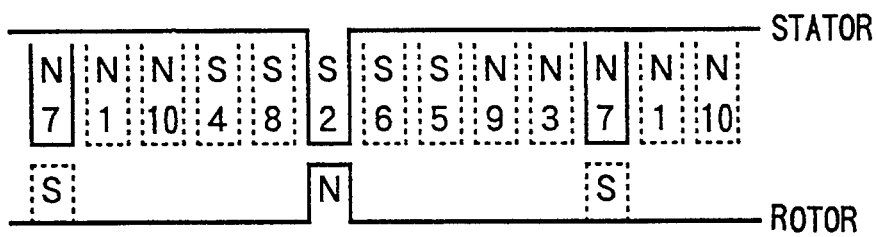
Figure 7:
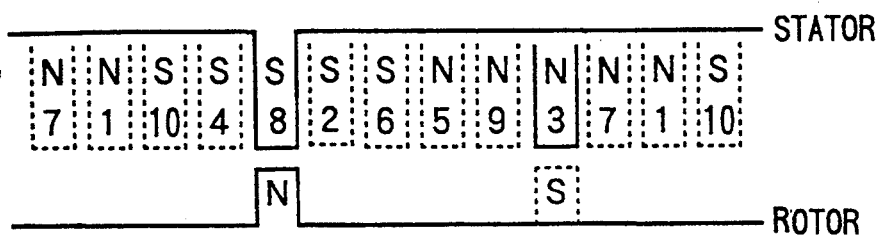
Figure 7:
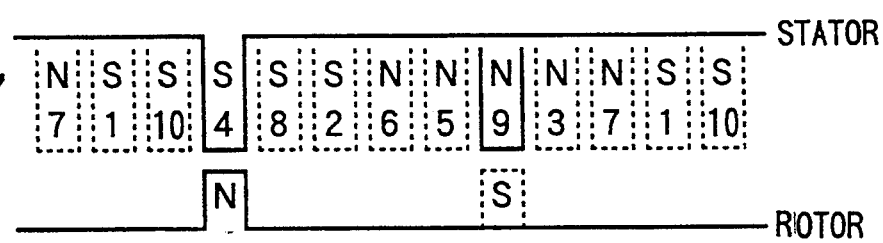
Figure 7:
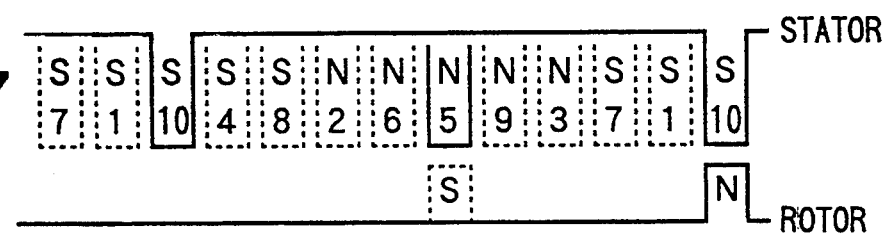
Figure 8:
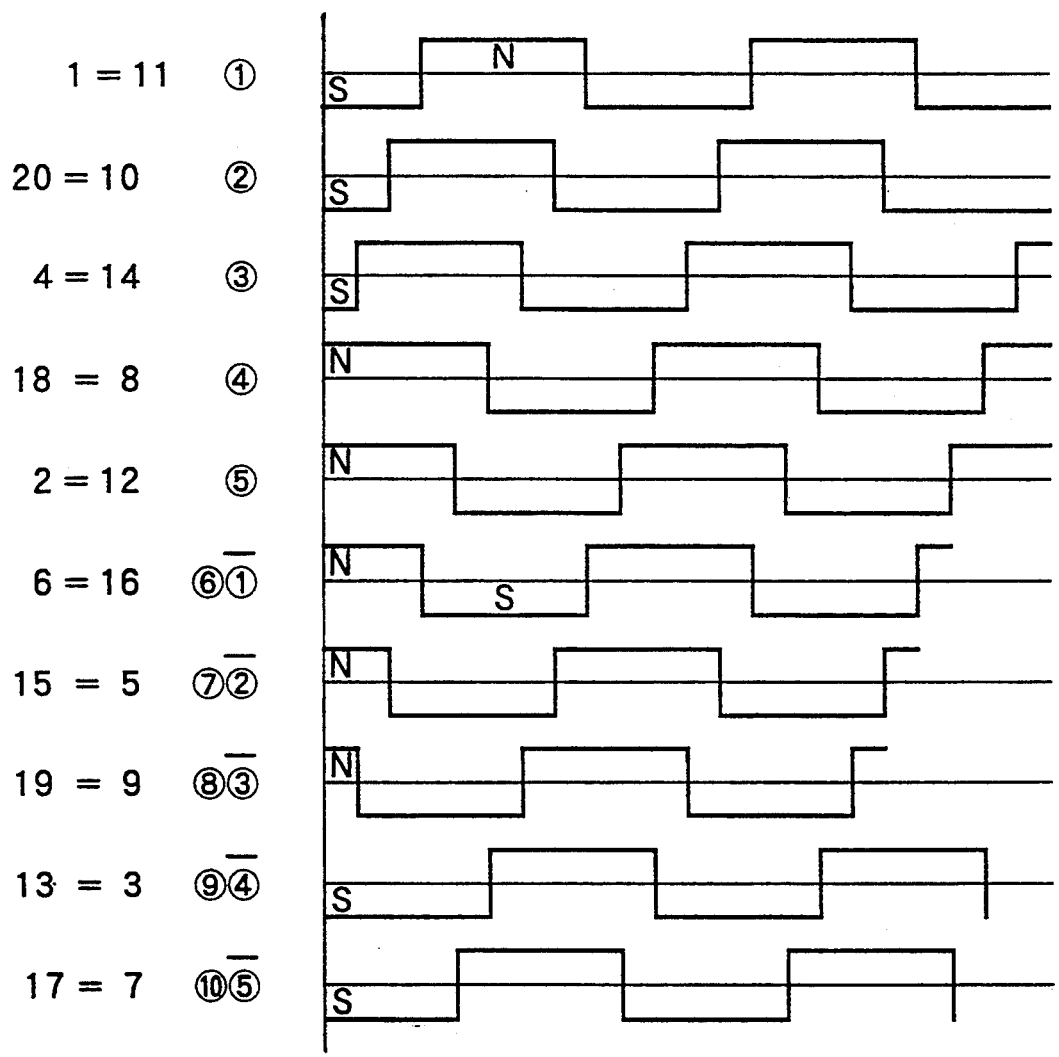
FIG. 8 is a set of timing charts showing the excitation ordeor for respective phases according to the present invention.

FIG. 8 shows a set of timing charts for the excitation of the respective main poles 1–20. The time proceeds in the right direction of the illustration. The manner of excitation changes in the order of the numbers shown as "excitation order". The revolutionary speed of the motor (or rotor shaft) changes as the time interval between the excitation order changes. FIG. 8 shows a case where the motor is rotated at a constant rate. When the motor is stopped, the present polarities of the main poles are maintained. Table IV shows the situation of the excitation corresponding to FIG. 8. FIG. 7 is a set of exploded views showing the positional relation between the rotor teeth and the main poles (stator teeth). FIGS. 7(A), 7(B), 7(C), - - - correspond to the excitation order 0, 1, 2, - - - , respectively.

First, a reset state will be defined. In the reset state, the main poles ①– 10 are excited to S, S, S, N, N, N, N, N, S and S, respectively, as shown in the column of excitation order 0 in FIG. 8. This situation is shown in the line of "polarity" of Table III. Table III also shows from which point (winding start or end of the lead) the current flows in the reset state by the arrows. The exciting polarity of each main pole in the reset state is determined by the flowing direction of the current and the winding direction of the coil.

TABLE III

| | PHASE | | | | | | | | | |
|---|---|---|---|---|---|---|---|---|---|---|
| | 1 | 2 | 3 | 4 | 5 | 6 | 7 | 8 | 9 | 10 |
| LEAD | ST | EN | EN | ST | ST | ST | EN | EN | ST | ST |
| MAIN POLE NO. | 1 | 10 | 14 | 18 | 2 | 6 | 5 | 9 | 13 | 17 |
| | 11 | 20 | 4 | 8 | 12 | 16 | 15 | 19 | 3 | 7 |
| WINDING DIRECTION | NO | RE | RE | RE | RE | RE | NO | NO | NO | NO |
| LEAD | E | S | S | E | E | E | S | S | E | E |
| CURRENT | ↓ | ↑ | ↑ | ↓ | ↓ | ↓ | ↑ | ↑ | ↓ | ↓ |
| POLARITY | S | S | S | N | N | N | N | N | S | S |

"EN" represents End, "ST" represents Start, "NO" represents Normal direction and "RE" represents Reverse direction.

The positional relationship between the rotor teeth and the main poles (stator teeth) in the reset state is shown in FIG. 7(A). As illustrated in FIG. 7(A), the main pole ① directly faces the N pole tooth. The main pole ① is excited to S. The two main poles ⑨ and 10 before the subject main pole ① and another two main poles ② and ③ after the subject main pole ① are also excited to S whereas remaining main poles are excited to N. In other words, particular five main poles ⑨, 10 , ①, ② and ③ are excited to the same polarity and the remainder is excited to the opposite polarity.

In the next excitation (FIG. 7(B)), the polarity of the main pole ⑧ before the first main pole ⑨ of five main poles ⑨–③ and that of the last main pole ③ of five main poles are respectively reversed. Specifically, the main pole ⑧ is excited to S and the main pole ③ is excited to N. As a result, the rotor is rotated by one step pitch (FIG. 7(B)). Accordingly, the main pole 10 now directly faces the N pole tooth of the rotor, as shown in FIG. 7(B). As the excitation proceeds in the order 3, 4, 5, - - - and 10 of "excitation order" of FIG. 8, the rotor is rotated as shown in FIGS. 7(C), 7(D), 7(E), - - - and 7(J). The excitation order 9 corresponds to FIG. 7(J). The next excitation after the excitation order 9 or after FIG. 7(J) is the same as FIG. 7(A) (one cycle of excitation). FIGS. 7(A)–7(J) illustrate ten kinds (or patterns) of excitation.

Referring back to FIG. 8, the waves of lower half (main poles ⑥- 10 ) have the opposite shapes of those of upper half (main poles ①-⑤). In FIG. 8,"-" over the encircled numeral indicates "reversed". Table IV shows the relationship between the main pole Nos. (or the phases) and the excitation order derived from FIG. 8.

TABLE IV

| EXCITATION ORDER | MAIN POLE NO. | | | | | | | | | |
|---|---|---|---|---|---|---|---|---|---|---|
| | 1 | 2 | 3 | 4 | 5 | 6 | 7 | 8 | 9 | 10 |
| | PHASE | | | | | | | | | |
| | 1 | 5 | 9 | 3 | 7 | 6 | 10 | 4 | 8 | 2 |
| 0 | S | N | S | S | N | N | S | N | N | S |
| 1 | S | N | S | N | N | N | S | N | S | S |
| 2 | S | N | S | N | S | N | S | N | S | N |
| 3 | N | N | S | N | S | S | S | N | S | N |
| 4 | N | S | S | N | S | S | N | N | S | N |
| 5 | N | S | N | N | S | S | N | S | S | N |
| 6 | N | S | N | S | S | S | N | S | N | N |
| 7 | N | S | N | S | N | S | N | S | N | S |
| 8 | S | S | N | S | N | N | N | S | N | S |
| 9 | S | N | N | S | N | N | S | S | N | S |
| 10 | S | N | S | S | N | N | S | N | N | S |

Next, the application timing of the exciting current to the five leads will be explained.

Figure 9:
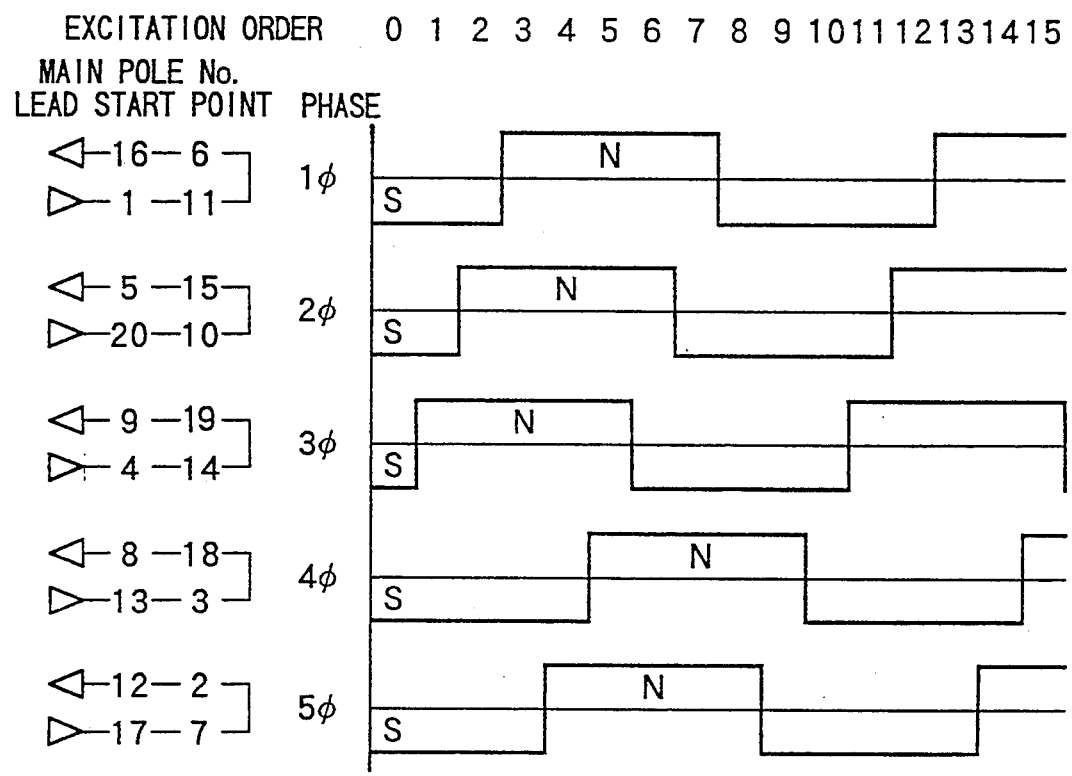
FIGS. 9 and 10 are sets of timing charts showing when an excitation current is applied to the leads, respectively.

Referring to FIG. 9, a line connecting the main pole Nos. (e.g., -1-11-6-16-) represents the lead 41 of FIG. 5(B) and a triangle indicates the current direction. However, it should be noted that the main pole Nos. (e.g., 1-11-6-16) in FIG. 9 do not always indicate the order of the four coils connected in series forming the lead (FIG. 5(B)). In FIG. 9, when a driving pulse of phase O1 is applied, the main pole Nos. 1 and 11 are excited to S polarity at the excitation order 0 (FIG. 8). In this situation, the main pole Nos. 6 and 16 are excited to N polarity as shown in the excitation order column 0 in FIG. 8 or 9. When a driving pulse of phase O2 is applied, the main pole Nos. 10 and 20 are excited to S as shown in the excitation column of 0 in FIG. 8 whereas the main pole Nos. 5 and 15 are excited to N. In cases of phases O3, O4 and O5, likewise, the main pole Nos. 4 and 9 (fifth next one) are excited to the opposite polarities, the main pole Nos. 14 and 19 (fifth next one) are excited to the opposite polarities, the main pole Nos. 3 and 8 (fifth next one) are excited to the opposite polarities, the main pole Nos. 13 and 18 (fifth next one) are excited to the opposite polarities, the main pole Nos. 12 and 17 (fifth next one) are excited to the opposite polarities and the main pole Nos. 2 and 7 (fifth next one) are excited to the opposite polarities. In the order of the excitation order, the excitation states vary as shown in FIG. 8. In other words, FIGS. 8 and 9 illustrate the same phenomena. However, the phases O1, O2, O3, - - - (phases of driving pulse) in FIG. 9 do not always correspond to the phases ①, ②, ③, - - - (main pole pair numbers) in FIG. 8.

Figure 10:
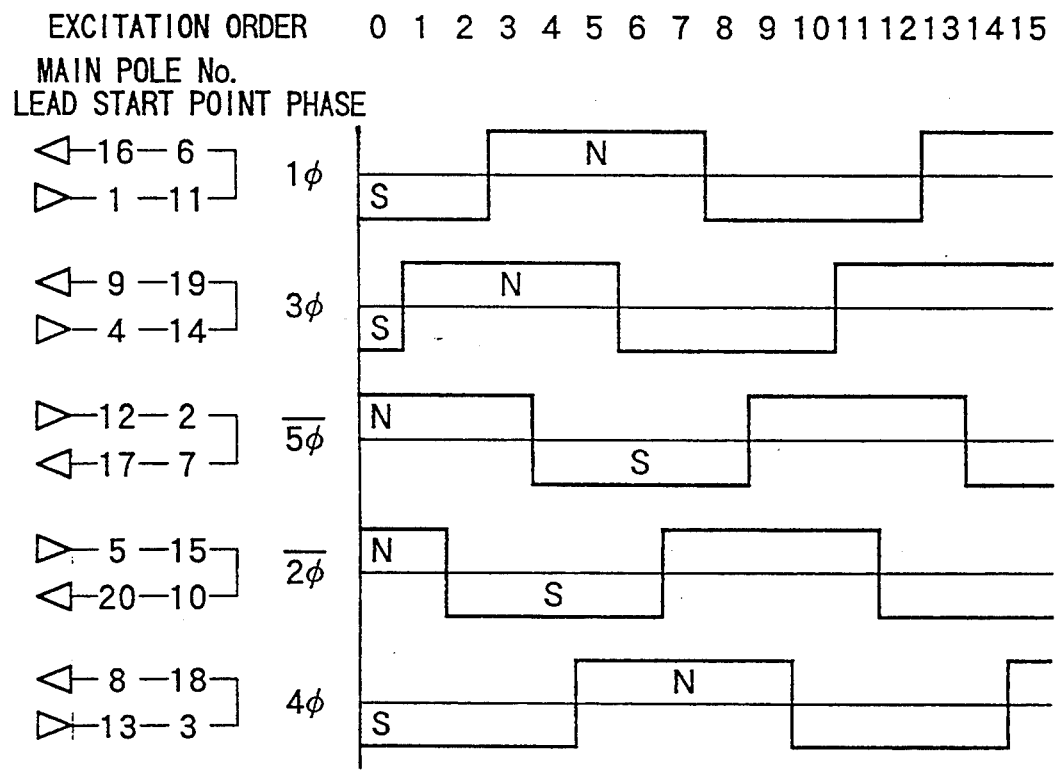

FIG. 10 shows a case similar to FIG. 9, in which the phases O2 and O5 are reversed ("-" over the phase indicates "reversed".) and the order of the phases O1 to O5 are changed. In FIG. 10, a drive pulse wave of each phase has a duty ratio of 1:1, and these five pulse waves have the same phase difference relative to the adjacent pulse waves (the phase difference between the pulses O1 and O3 is the same as that between the pulses O3 and θ5). The ten excitations (phases ①- 10 ) in FIG. 8 are obtained by appropriately distributing these five pulses to the five leads. The five-phase pulses of FIG. 10 or 9 can be obtained from a driving device used for a known five-phase stepping motor. Therefore, it is not necessary to prepare new driving device for the above-described ten-phase stepping motor. A widely used, conventional module can be used.

Next, the way of excitation for various wirings will be explained.

From the above explanation, it is understood that the five-phase driving pulses can realize the driving of the five-phase stepping motor (ten kinds of excitation). Since the stepping motor has five leads 41, it is possible to treat this 10-phase stepping motor as five-phase stepping motor. Accordingly, the leads 41 are wired to the delta or Y connection as shown in FIG. 6(B) or 6(C). There are various types of combination of excitation in each connection. The patterns of excitation of Tables V to XI can be used to drive the ten-phase stepping motor by the five-phase excitation pulse, respectively. In each Table, "P" represents a number of input terminals to which an electric power is simultaneously applied and "Φ" represents a number of leads through which the current flows. "-" connecting two numbers represents that one of these two numbers is selectively or alternatively used. Further, "1" indicates that a high voltage is applied to a connection and "0" indicates that a low voltage is applied to a connection.

In Table V (Δ4-5P 4-5=), for example, the high voltage (1) is applied to the connections ΔA and ΔC at the excitation order 0 whereas the low voltage (0) is applied to the connections ΔB and ΔE. The connection 66 D (blank) has a floating voltage. FIG. 11(A) shows this situation. In this situation, the current flows from the high voltage point (unshaded circle) to the low voltage point (shaded circle), as indicated by the arrows in FIG. 11(A). Namely, the current flows in the leads 41a, 41c and 41d in the clockwise direction in FIG. 11(A) whereas the current flows in the leads 41b and 41e in the counterclockwise direction. This is equivalent to a case where the current is caused to flow in the five leads upon application of the power to the four input terminals (the connections ΔA, ΔB, ΔC and ΔE in FIG. 11(A)). The current flowing in the clockwise direction represents that a desired main pole is excited to S polarity while the current flowing in the counterclockwise direction represents that a desired main pole is excited to N polarity. In FIG. 11(A), (S) indicates that when the coil wound in the normal direction in the lead 41a (or 41c or 41d) is excited to S polarity, the coil wound in the normal direction in the lead 41b (or 41e) is excited to S polarity. In the next excitation (excitation order 1) (Table V), a high voltage is applied to the connection ΔD so that the power is fed to all the five input terminals. However, no current flows in the lead 41c so that it is equivalent to a case where the current only flows in four leads (not shown).

TABLE V

| EXCITATION ORDER | Δ4-5P 4-5Φ EXCITATION | | | | | | | | | | | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 |
| ΔA | 1 | 1 | 1 | 1 | 1 | | 0 | 0 | 0 | 0 | 0 | 0 | 0 | 0 | | 1 | 1 | 1 | | |
| ΔB | 0 | 0 | 0 | 0 | | 1 | 1 | 1 | 1 | 1 | 1 | 1 | 1 | | 0 | 0 | 0 | 0 | | |
| ΔC | 1 | 1 | | 0 | 0 | 0 | 0 | 0 | 0 | 0 | 0 | | 1 | 1 | 1 | 1 | 1 | 1 | | |

TABLE V-continued

| EXCITATION ORDER | Δ4-5P 4-5Φ EXCITATION | | | | | | | | | | | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 |
| ΔD | | 1 | 1 | 1 | 1 | 1 | 1 | 1 | 1 | 1 | | 0 | 0 | 0 | 0 | 0 | 0 | 0 | 0 | 0 |
| ΔE | 0 | 0 | 0 | 0 | 0 | 0 | 0 | 0 | | 1 | 1 | 1 | 1 | 1 | 1 | 1 | 1 | 1 | | 0 |

Table VI shows the excitation of Δ4P, 5-5Φ. In this table, "1", "0" and " " (blank) represent the same as those in Table V. At the excitation order 0, a high voltage is applied to the connections ΔA and ΔC, a low voltage is applied to the connections ΔB and ΔE and ΔD has a flowing voltage.

TABLE VI

| EXCITATION ORDER | Δ4P 5-5Φ EXCITATION | | | | | | | | | |
|---|---|---|---|---|---|---|---|---|---|---|
| | 0 | 1 | 2 | 3 | 4 | 5 | 6 | 7 | 8 | 9 |
| ΔA | 1 | 1 | 1 | | 0 | 0 | 0 | 0 | | 1 |
| ΔB | 0 | 0 | | 1 | 1 | 1 | 1 | | 0 | 0 |
| ΔC | 1 | | 0 | 0 | 0 | 0 | | 1 | 1 | 1 |
| ΔD | | 1 | 1 | 1 | 1 | 0 | 0 | 0 | 0 | |
| ΔE | 0 | 0 | 0 | 0 | | 1 | 1 | 1 | 1 | |

FIG. 11(B) illustrates the current directions and the excitation polarities in case of excitation order of 0 in Table VII. FIG. 11(B) also illustrates those in case of excitation order 0 in Table VIII.

TABLE VII

| EXCITATION ORDER | Δ2P 5-5Φ EXCITATION | | | | | | | | | |
|---|---|---|---|---|---|---|---|---|---|---|
| | 0 | 1 | 2 | 3 | 4 | 5 | 6 | 7 | 8 | 9 |
| ΔA | | 1 | 1 | | | | | 0 | 0 | |
| ΔB | | | 1 | 1 | | | | | 0 | 0 |
| ΔC | 0 | 0 | | | | 1 | 1 | | | |
| ΔD | | | 0 | 0 | | | | 1 | 1 | |
| ΔE | 1 | | | | 0 | 0 | | | | 1 |

TABLE VIII

| EXCITATION ORDER | Δ3P 4-4Φ EXCITATION | | | | | | | | | |
|---|---|---|---|---|---|---|---|---|---|---|
| | 0 | 1 | 2 | 3 | 4 | 5 | 6 | 7 | 8 | 9 |
| ΔA | 1 | 1 | 1 | | 0 | 0 | 0 | | | |
| ΔB | | | 1 | 1 | 1 | | 0 | 0 | 0 | |
| ΔC | 0 | 0 | | | 1 | 1 | 1 | | 0 | 0 |
| ΔD | | 0 | 0 | 0 | | | 1 | 1 | 1 | |
| ΔE | 1 | | 0 | 0 | 0 | | | | 1 | 1 |

Table IX shows the excitation of Δ2-3P, 4-5Φ. In this table, "1", "0" and " " (blank) represent the same as those in Table V. In Table IX, a high voltage is applied to the connection ΔE only, a low voltage is applied to the connection ΔC only and the remainder has a floating voltage.

TABLE IX

| EXCITATION ORDER | Δ2-3P 4-5Φ EXCITATION | | | | | | | | | | | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 |
| ΔA | | 1 | 1 | 1 | 1 | 1 | | | | | | 0 | 0 | 0 | 0 | 0 | | | | |
| ΔB | | | | 1 | 1 | 1 | 1 | 1 | | | | | | 0 | 0 | 0 | 0 | 0 | | |
| ΔC | 0 | 0 | 0 | 0 | | | 1 | 1 | 1 | 1 | 1 | | | | | 0 | 0 | 0 | 0 | 0 |
| ΔD | | | 0 | 0 | 0 | 0 | 0 | | | 1 | 1 | 1 | 1 | 1 | | | | | | |
| ΔE | 1 | 1 | | | | 0 | 0 | 0 | 0 | 0 | | | | | 1 | 1 | 1 | 1 | 1 | |

Referring to Table X (Y4-5P/4-5Φ), the high voltage is applied to the connections YA and YC while the low voltage is applied to the connections YB and YE at the excitation order 0. The connection YD has a floating voltage. FIG. 11(C) shows this situation. In this situation, the current flows in the leads 41a and 41c toward the center while the current flows in the leads 41b and 41e radially outward. Therefore, this situation represents a case where four input terminals are used to cause the current to flow in the four leads 41a, 41b, 41c and 41e. The current flowing radially inward represents that a desired main pole is excited to S polarity while the current flowing radially outward represents that a desired main pole is excited to N polarity. In the next excitation (excitation order 1) (Table X), the high voltage is applied to the connection YD. This situation represents a case where the power is applied to all the five input terminals. Specifically, the current also flows in the lead 41d in the radially inward direction so that the current flows in all the five leads.

TABLE X

| EXCITATION ORDER | Y4-5P 4-5Φ EXCITATION | | | | | | | | | | | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 |
| YA | 1 | 1 | 1 | 1 | 1 | 1 | | 0 | 0 | 0 | 0 | 0 | 0 | 0 | 0 | | 1 | 1 | 1 | 1 |
| YB | 0 | 0 | 0 | 0 | | 1 | 1 | 1 | 1 | 1 | 1 | 1 | 1 | | 0 | 0 | 0 | 0 | 0 | 0 |
| YC | 1 | 1 | | 0 | 0 | 0 | 0 | 0 | 0 | 0 | 0 | | 1 | 1 | 1 | 1 | 1 | 1 | 1 | 1 |
| YD | | 1 | 1 | 1 | 1 | 1 | 1 | 1 | 1 | | 0 | 0 | 0 | 0 | 0 | 0 | 0 | 0 | | |
| YE | 0 | 0 | 0 | 0 | 0 | 0 | 0 | | 1 | 1 | 1 | 1 | 1 | 1 | 1 | 1 | 1 | | 0 | |

Table XI shows the excitation of Y4P/4-4Φ. At the excitation order 0, the high voltage is applied to the connections YA and YC and the low voltage is applied to the connections YB and YE. The connection YD has the floating voltage.

TABLE XI

Y4P 4-4Φ EXCITATION

| EXCITATION ORDER | 0 | 1 | 2 | 3 | 4 | 5 | 6 | 7 | 8 | 9 |
|---|---|---|---|---|---|---|---|---|---|---|
| YA | 1 | 1 | 1 |   | 0 | 0 | 0 | 0 |   | 1 |
| YB | 0 | 0 |   | 1 | 1 | 1 | 1 |   | 0 | 0 |
| YC | 1 |   | 0 | 0 | 0 | 0 |   | 1 | 1 | 1 |
| YD |   | 1 | 1 | 1 | 1 |   | 0 | 0 | 0 | 0 |
| YE | 0 | 0 | 0 | 0 |   | 1 | 1 | 1 | 1 |   |

According to the hybrid stepping motor of the present invention, the stepping rotation is realized by applying the ten-phase excitation (ten patterns of excitation) and the ten-phase drive is realized by the five-phase driving pulse.

Further, since the two teeth on each main pole (stator teeth) are symmetrical with respect to the center line of the main pole, electromagnet noises due to excitation imbalance is eliminated.

In addition, since the stator is 90-degree rotation-symmetrical, the symmetry of the stator around the rotation shaft is improved. Moreover, since four of five successive intervals between the main poles are equal to each other, the balance of the main poles is improved. Therefore, the stability at a high speed is improved. Further, the better symmetry of the stator around the rotation shaft results in the cancellation of stepping errors due to manufacturing inaccuracy. The cancellation of manufacturing errors results in the improvement of the accuracy of the stepping movement.

Furthermore, when one stator tooth directly faces the N pole tooth, another stator tooth formed at 90-degree away from said one stator always directly faces the S pole tooth. Therefore, if these stator teeth are excited to the opposite polarities, effective attraction and repulsion are realized.

In the present invention, since the stator has ten phases and 20 poles and the stepping pitch is reduced, a thinner main pole can be employed and a number of winding is reduced. The thinner main pole results in a reduced hysteresis loss at a main pole stem portion and a reduced eddy current loss. This advantage is particularly noticeable since a heat emission is reduced when the stepping motor rotates at a high speed. Further, if the number of winding of coil is small, the inductance is small. Thus, the response at the starting and the high speed rotation is improved and the heat generation is suppressed.

Since the current directions are revered at every five main poles, a ten-phase driving is achieved. Therefore, the driving device and the driving timing are simplified.

Since a main pole always exists at a 90-degree away from a certain main pole, the winding of coil around the main poles by the winding machine is simplified and the productivity is improved.

Next, another embodiment of the present invention will be explained with reference to FIG. 12.

Figure 12:
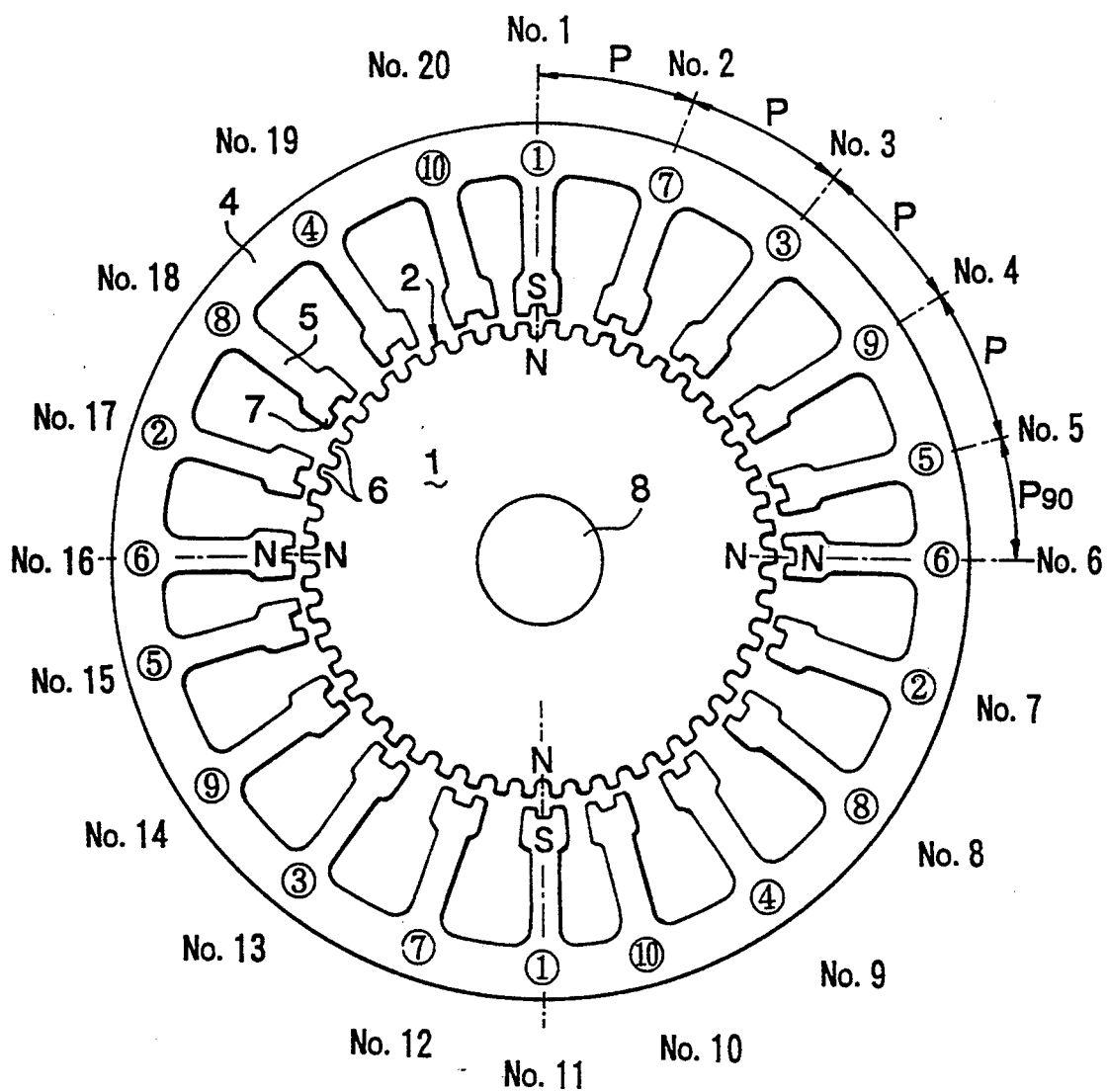
FIG. 12 illustrates a sectional view of another hybrid stepping motor, as viewed in a rotational axis direction, according to the present invention.

As illustrated in FIG. 12, a hybrid stepping motor of 10-phase and 20-main pole includes a rotor 1, rotor teeth 6, a stator 4, main poles 5 and stator teeth 7, like the foregoing embodiment. The rotor teeth 6 includes N pole teeth and S pole teeth alternatively. The sectional view of the stepping motor in the axial direction of a rotor shaft 8 is similar to that shown in FIG. 2. In this embodiment, "n" in the equation (1) is four. Therefore, the equations (1) and (2) are expressed as follows:

$$P = (7.2 \times 2 - 0.72 \times 4) + 7.2 = 18.72 \quad (1b)$$

$$\Sigma P = 18.75 \times 10 = 187.2 \quad (2b)$$

The arrangement of the main poles in accordance with these values are shown in Table XII. The interval between main pole Nos. 5 and 6 (15.12 degrees) is smaller than that between other main poles (18.72 degrees). The discrepancy from the nearest N pole tooth in the clockwise direction is also shown in Table XII. The numerals ①- 10 are assigned in the order of increasing discrepancy. This order ①, ⑦, ③, ⑨, ⑤, ⑥, ②, ③,④ and 10 is different from that in the previous embodiment.

TABLE XII

| M.P No. | Posi | Tooth No. | Tooth Posi | Numeral Pair No | Discrepancy From N Pole | M.P. Interval | Tooth Clr |
|---|---|---|---|---|---|---|---|
| 1 | 0.00 | 40 | 356.40 | 1 | 0.00 | | |
| | | 1 | 3.60 | | | 18.72 | 11.52 |
| 2 | 18.72 | 2 | 15.12 | 7 | 4.43 | | |
| | | 3 | 22.32 | | | 18.72 | 11.52 |
| 3 | 37.44 | 4 | 33.84 | 3 | 1.44 | | |
| | | 5 | 41.04 | | | 18.72 | 11.52 |
| 4 | 51.16 | 6 | 52.56 | 9 | 5.76 | | |
| | | 7 | 59.76 | | | 18.72 | 11.52 |
| 5 | 74.88 | 8 | 71.28 | 5 | 2.88 | | |
| | | 9 | 78.48 | | | 15.12 | 7.92 |
| 6 | 90.00 | 10 | 86.40 | 6 | 3.6 | | |
| | | 11 | 93.60 | | | 18.72 | 11.52 |
| 7 | 108.72 | 12 | 105.12 | 2 | 0.72 | | |
| | | 13 | 112.32 | | | 18.72 | 11.52 |
| 8 | 127.44 | 14 | 123.84 | 8 | 5.04 | | |
| | | 15 | 131.04 | | | 18.72 | 11.52 |
| 9 | 146.16 | 16 | 142.56 | 4 | 2.16 | | |
| | | 17 | 149.76 | | | 18.72 | 11.52 |
| 10 | 164.88 | 18 | 161.28 | 10 | 6.48 | | |
| | | 19 | 168.48 | | | 15.12 | 7.92 |
| 11 | 180.00 | 20 | 176.40 | 1 | 0.00 | | |
| | | 21 | 183.60 | | | | |

In this embodiment, the stepping motion is realized by exciting the main poles in the order of ①,②, ③, ④, ⑤, ⑥, ⑦, ⑧, ⑨ and 10 .

This embodiment has the same advantages as the first embodiment.

Figure 13A:
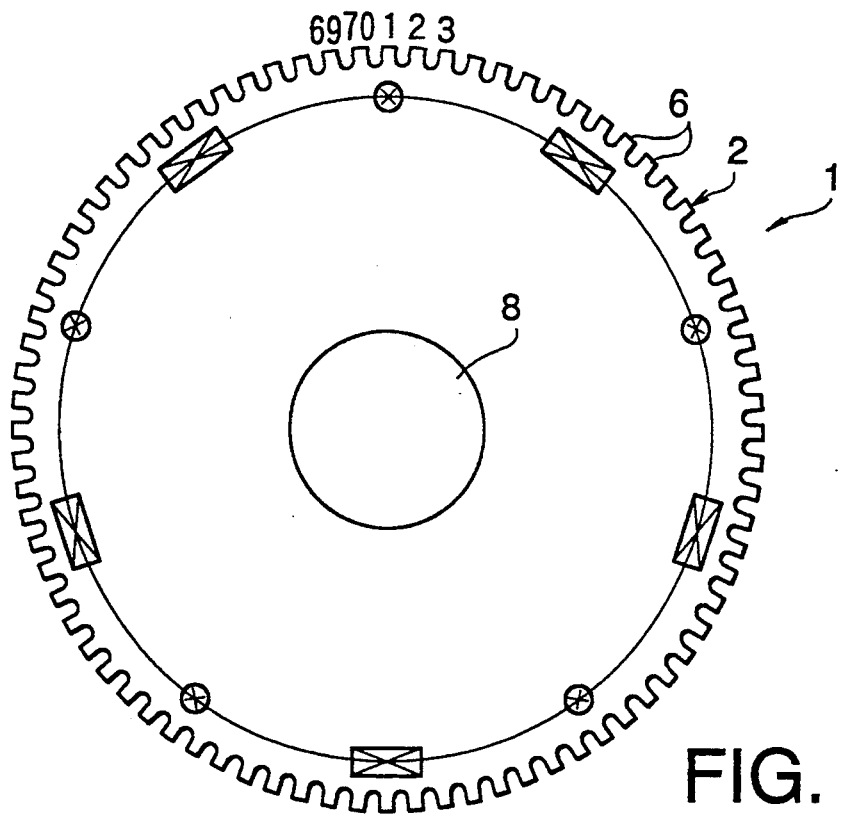
FIG. 13 is a sectional view of a rotor according to another embodiment of the present invention.

FIG. 13 depicts other embodiments according to the present invention. Specifically, the number of the rotor teeth 6 is changed. The rotor in FIG. 13(A) has seventy N pole teeth and seventy S pole teeth. In the illustration, only N pole teeth 2 are illustrated. The tooth pitch of the rotor is about 5.14 degrees (dividing 360 by 70). If the rotor 1 of FIG. 13(A) is used instead of the rotor of FIG. 1, the main pole interval and the positions of the stator teeth will be determined using θ=360/700 in the equations (1) and (2).

Figure 13B:
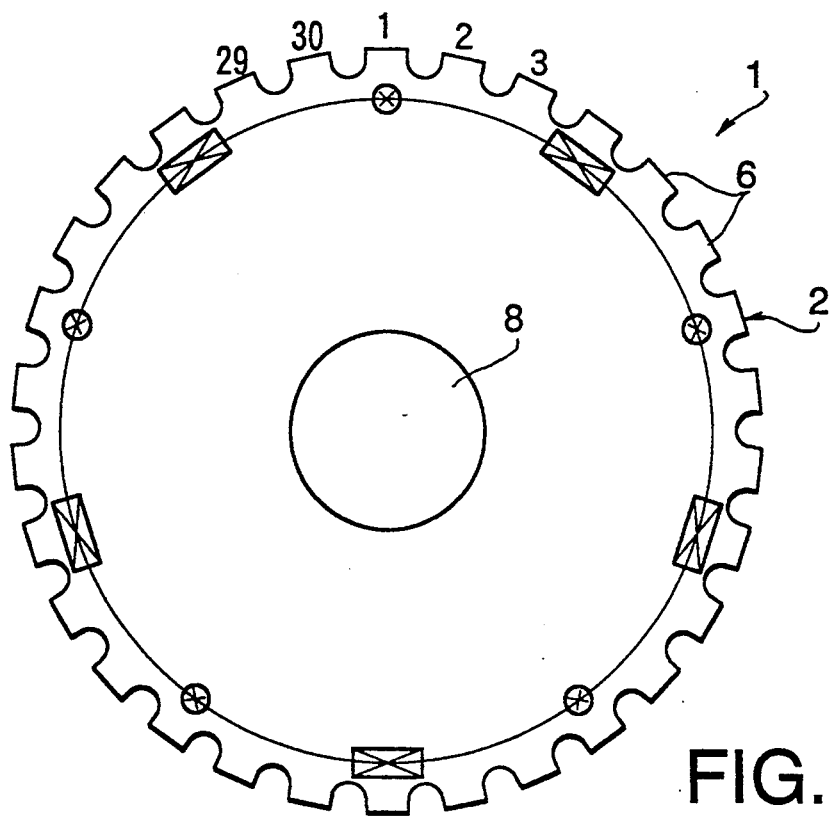

The rotor in FIG. 13(B) has thirty N pole teeth 2. The rotor tooth pitch is 12 degrees (dividing 360 by 30). If the stator of FIG. 13(B) is used instead of the rotor of FIG. 1, the main pole interval and the positions of the stator teeth will be determined using θ=360/300.

In the above embodiments, the length of the tooth portion of the rotor tooth is the same as that of the trough portion of the rotor tooth and such is the case with the stator tooth. However, the ratio of tooth and trough may be changed. Further, edges of the tooth may be tapered.

We claim:

1. A ten-phase hybrid stepping motor comprising:

a rotor having rotor teeth, the rotor having an axial direction, a circumferential direction and a radial direction perpendicular to the axial direction, the rotor teeth including N pole teeth and S pole teeth alternatively arranged in the circumferential direction of the rotor at constant intervals, the rotor teeth having a rotor tooth pitch, the rotor tooth pitch being equal to a pitch between two adjacent N or S pole teeth;

a stator having Nos. 1–20 main poles, the main poles surrounding the rotor in circumferential direction of the rotor, each main pole extending toward the rotor in the radial direction of the rotor, each main pole having a free end and a center line in its extending direction, a stator tooth being formed at the free end of each main pole, the stator teeth facing the rotor teeth; and a coil around each main pole for excitation of the main pole, whereby stepping motion of the rotor is realized upon excitation of the main poles, the magnitude of stepping pitch being obtained by dividing the rotor tooth pitch by ten, Nos. 1–10 main poles and Nos. 11–20 main poles facing each other in radial direction of the rotor respectively, an arbitrary main pole and a fifth next main pole having a 90-degree relation, and the teeth on Nos. 1–10 main poles and those on Nos. 11–20 main poles respectively having positions determined by the following expression;

$$Pt \times k + m \times \Theta$$

where Pt represents the rotor tooth pitch, $\Theta$ represents the magnitude of the stepping pitch, m represents an integer between 0 and 9 but different from k; k represents an arbitrary integer between 0 and K−1 and K represents a number of N pole teeth.

2. The hybrid stepping motor of claim 1, wherein a stator tooth on an arbitrary main pole has a position determined by substituting k=an rounded integer as obtained by dividing K by 4 and m=5 into the expression $Pt \times k + m \times \theta$ as viewed from another stator tooth on a main pole 90 degrees away from said arbitrary main pole.

3. The hybrid stepping motor of claim 2, wherein the number of N pole teeth (K) is given by:

$$K = 2 \times j$$

where j represents an arbitrary odd number greater than three.

4. The hybrid stepping motor of claim 3, wherein the number of the N pole teeth is fifty and the pitch between two adjacent N pole teeth is 7.2 degrees, the number of the S pole teeth is fifty and the pitch between two adjacent S pole teeth is 7.2 degrees and the angular interval between adjacent N and S pole teeth is 3.6 degrees.

5. The hybrid stepping motor of claim 2, wherein a plurality of stator teeth are formed on the free end of each main pole, and the stator teeth on each main pole are symmetrical with respect to the center line of each main pole.

6. The hybrid stepping motor of claim 5, wherein two stator teeth are formed on the free end of each main pole and the pitch between the two stator teeth on one main pole is equal to the rotor tooth pitch.

7. The hybrid stepping motor of claim 1, wherein Nos. 1–10 main poles are arranged such that their positions are determined by the expression $Pt \times k + m \times \theta$ in the order of Nos. 1, 10, 4, 8, 2, 6, 5, 9, 3 and 7 main poles as m=0–9 is substituted in the order of 0, 1, 2, 3, 4, 5, 6, 7, 8 and 9.

8. The hybrid stepping motor of claim 7, wherein $\theta$ is 0.72 degree.

9. The hybrid stepping motor of claim 1, wherein four of five intervals between six successive main poles are equal to each other and the remainder has a value obtained by subtracting a total of four equal intervals from 90 degrees.

10. The hybrid stepping motor of claim 9, wherein the interval between two adjacent main poles is given by a following equation:

$$P - (2Pt - \Theta \times n) + Pt$$

where P represents the interval between two adjacent main poles and n represents an integer between one and ten except five, and Nos. 1–5 main poles are arranged with the intervals Ps, No. 6 main pole is arranged with an interval $P_{90}$ obtained by subtracting $4 \times P$ from 90 degrees and Nos. 6–10 main poles are arranged with the intervals Ps.

11. The hybrid stepping motor of claim 10, wherein n is determined such that $\Sigma P$, which is given by the following equation, becomes a value close to 180 degrees:

$$\Sigma P = \{(2Pt - \theta \times n) + PT\} \times O$$

where O represents the number of main poles in half of the stator and $\Sigma P$ represents the sum of intervals between the main poles arranged at the intervals Ps in half of the stator.

12. The hybrid stepping motor of claim 1, wherein the rotor tooth pitch is 7.2 degrees, the center lines of Nos. 1–10 main poles extend in turn in 0, 17.28, 34.56, 51.84, 69.12, 90, 107.28, 124.56, 141.84 and 159.2-degree directions, two stator teeth are formed on the free end of each main pole and the two stator teeth on each main pole extend in 3.6-degree directions from the center line of the main pole on both sides of the center line of the main pole.

13. The hybrid stepping motor of claim 1, wherein the N pole teeth extend in a first plane in the radial direction of the rotor and the S pole teeth extend in a second plane in the radial direction of the rotor, the first and second planes being spaced from each other in the axial direction of the rotor.

14. The hybrid stepping motor of claim 13, wherein the rotor includes a rotor shaft, two gears are mounted on ends of the rotor shaft to respectively extend in the first and second planes, and a permanent magnet is placed between the gears to form the N and S pole gears whereby the N and S pole teeth are formed on the N and S pole gears respectively.

15. The hybrid stepping motor of claim 14, wherein the stator has a cylindrical body surrounding the N and S pole gears, the cylindrical body extends in the axial direction of the rotor and the tooth on each main pole has a width in the axial direction of the rotor such that the tooth on each main pole can face the teeth of both the N and S pole gears.

16. A hybrid stepping motor comprising:
a rotor having rotor teeth, the rotor having an axial direction, a circumferential direction and a radial direction perpendicular to the axial direction, the rotor teeth including N pole teeth and S pole teeth alternatively arranged in the circumferential direction of the rotor at constant intervals, the rotor tooth having a rotor tooth pitch, the rotor tooth pitch being equal to a pitch between two adjacent N or S pole teeth;
a stator having Nos. 1–20 main poles, the main poles surrounding the rotor in the circumferential direction of the rotor, each main pole extending toward the rotor in the radial direction of the rotor, each main pole having a free end, a stem portion and a center line in its extending direction, a stator tooth being formed at the free end of each main pole, the stator teeth facing the rotor teeth; and
a coil around each main pole for excitation of the main pole, whereby stepping motion of the rotor is realized upon excitation of the main poles, a magnitude of stepping pitch being obtained by dividing the rotor tooth pitch by ten,
Nos. 1–10 main poles and Nos. 11–20 main poles facing each other in the radial direction of the rotor respectively, an arbitrary main pole and a fifth next main pole having a 90-degree relation,
the teeth on Nos. 1–10 main poles and those on Nos. 11–20 main poles respectively having positions determined by the following expression:

$$Pt \times k + m \times \Theta$$

where Pt represents the rotor tooth pitch, $\Theta$ represents the magnitude of the stepping pitch, m represents an integer between 0 and 9 but different from k, k represents an arbitrary integer between 0 and K−1 and K represents a number of N pole teeth,
the stator tooth on an arbitrary main pole having a position determined by substituting k=an rounded integer as obtained by dividing K by 4 and m=5 into the expression $Pt \times k + m \times \Theta$ as viewed from another stator tooth on a main pole 90 degrees away from the arbitrary main pole, and
a coil around a certain main pole being wound in an opposite direction as a coil around a main pole 90 degrees away from the certain main pole.

17. The hybrid stepping motor of claim 16, wherein each four coils around four main poles having a 90-degree relation with respect to each other are connected in series to form five leads, each lead alternatively having normally wound coils and reversely wound coils.

18. The hybrid stepping motor of claim 17, wherein each lead has two ends to allow a current to flow from one end to the other end or vice versa.

19. The hybrid stepping motor of claim 18, wherein the two ends of one lead are a free end of a coil around No. 1 main pole and a free end of a coil around No. 16 main pole, the two ends of one lead are a free end of a coil around No. 5 main pole and a free end of a coil around No. 20 main pole, the two ends of one lead are a free end of a coil around No. 9 main pole and a free end of a coil around No. 4 main pole, the two ends of one lead are a free end of a coil around No. 13 main pole and a free end of a coil around No. 8 main pole, and the two ends of one lead are a free end of a coil around No. 17 main pole and a free end of a coil around No. 12 main pole.

20. The hybrid stepping motor of claim 16, wherein each coil is wound around the stem portion of the main pole.

21. A ten-phase hybrid stepping motor comprising:
a rotor having rotor teeth, the rotor having an axial direction, a circumferential direction and a radial direction, the rotor teeth including N pole teeth and S pole teeth alternatively arranged in the circumferential direction of the rotor at constant intervals, the rotor tooth having a rotor tooth pitch and the rotor tooth pitch being equal to a pitch between two adjacent N or S pole teeth;
a stator having Nos. 1–20 main poles, the main poles surrounding the rotor in the circumferential direction of the rotor, each main pole extending toward the rotor in the radial direction of the rotor, each main pole having a free end of each main pole, the stator teeth facing the rotor teeth;
five input terminals; and a coil around each main pole for excitation of the main pole, whereby stepping motion of the rotor is realized upon excitation of the main poles, the magnitude of stepping pitch being obtained by dividing the rotor tooth pitch by ten,
Nos. 1–10 main poles and Nos. 11–20 main poles facing each other in the radial direction of the rotor respectively and an arbitrary main pole and a fifth next main pole are 90-degree relationship to each other,
the teeth on Nos. 1–10 main poles and those on Nos. 11–20 main poles respectively having positions determined by an expression:

$$Pt \times k + m \times \Theta$$

where Pt represents the rotor tooth pitch, $\Theta$ represents the magnitude of the stepping pitch, m represents an integer between 0 and 9 but different from k, k represents an arbitrary integer between 0 and K−1 and K represents a number of N pole teeth,
the stator tooth on an arbitrary main pole having a position determined by substituting k=−a rounded integer as obtained by dividing K by 4 and m=5 into the expression $Pt \times k + m \times \Theta$ as viewed from another stator tooth on a main pole 90 degrees away from the arbitrary main pole,
a coil around a certain main pole being wound in an opposite direction as a coil around a main pole 90 degrees away from the certain main pole,
each four coils around four main poles being in 90-degree relationship to each other being connected in series to form five leads, each lead alternatively having normally and reversely wound coils, each lead having two ends to allow a current to flow from one end to the other end or vice versa, and
at least one end of each lead being connected to one of the five input terminals.

22. The hybrid stepping motor of claim 21, wherein the five leads are connected in a circle, connections of each two leads serve as the five input terminals and a prescribed voltage is applied to each input terminal.

23. The hybrid stepping motor of claim 22, wherein five voltage pulses having different phases are applied to the five input terminals.

24. The hybrid stepping motor of claim 23, wherein the voltage pulse is high voltage, low voltage or floating voltage.

25. The hybrid stepping motor of claim 24, wherein the high voltage is applied to one, two or three of the five input terminals, the low voltage is applied to the remaining one or two input terminals and the floating voltage is applied to the remaining terminal.

26. The hybrid stepping motor of claim 21, wherein one set of ends of the five leads are connected to one point and the other set of ends of the five leads are given prescribed voltages respectively.

27. The hybrid stepping motor of claim 26, wherein five voltage pulses having different phases are applied to the five input terminals.

28. The hybrid stepping motor of claim 27, wherein the voltage pulse is high voltage, low voltage or floating voltage.

29. The hybrid stepping motor of claim 28, wherein the high voltage is applied to one, two or three of the five input terminals, the low voltage is applied to the remaining one or two input terminals and the floating voltage is applied to the remaining terminal.

* * * * *